US008433140B2

(12) United States Patent
Ke et al.

(10) Patent No.: US 8,433,140 B2
(45) Date of Patent: Apr. 30, 2013

(54) IMAGE METADATA PROPAGATION

(75) Inventors: Qifa Ke, Cupertino, CA (US); Ming Liu, Bellevue, WA (US); Yi Li, Issaquah, WA (US); Rui Hu, Beijing (CN); Yanfeng Sun, Beijing (CN)

(73) Assignee: Microsoft Corporation, Redmond, WA (US)

( * ) Notice: Subject to any disclaimer, the term of this patent is extended or adjusted under 35 U.S.C. 154(b) by 309 days.

(21) Appl. No.: 12/822,873

(22) Filed: Jun. 24, 2010

(65) Prior Publication Data

US 2011/0103699 A1 May 5, 2011

Related U.S. Application Data

(63) Continuation-in-part of application No. 12/610,810, filed on Nov. 2, 2009.

(51) Int. Cl.
*G06K 9/62* (2006.01)
*G06K 9/00* (2006.01)

(52) U.S. Cl.
USPC .......................................... 382/209; 382/224

(58) Field of Classification Search ............... 382/103, 382/209, 224; 707/769, E17.014
See application file for complete search history.

(56) References Cited

U.S. PATENT DOCUMENTS

| | | | |
|---|---|---|---|
| 5,579,471 A | 11/1996 | Barber et al. | |
| 6,445,834 B1 | 9/2002 | Rising, III | |
| 6,564,263 B1 | 5/2003 | Bergman | |
| 7,035,467 B2 | 4/2006 | Nicponski | |
| 7,103,215 B2 | 9/2006 | Buzuloiu | |
| 7,403,642 B2 | 7/2008 | Zhang | |
| 7,457,825 B2 | 11/2008 | Li et al. | |
| 7,639,890 B2 | 12/2009 | Kuriathungal | |
| 7,647,331 B2 | 1/2010 | Li et al. | |
| 7,752,185 B1 | 7/2010 | Kilmartin | |
| 7,844,591 B1 | 11/2010 | Lettau et al. | |
| 8,194,986 B2 * | 6/2012 | Conwell | 382/224 |
| 2003/0108237 A1 | 6/2003 | Hirata | |
| 2005/0238198 A1 | 10/2005 | Brown | |
| 2006/0226119 A1 | 10/2006 | Kannan et al. | |

(Continued)

FOREIGN PATENT DOCUMENTS

EP   0990997        4/2000
WO   2008073505 A1  6/2008

OTHER PUBLICATIONS

Non-final OA U.S. Appl. No. 12/610,810 of Oct. 27, 2011.

(Continued)

*Primary Examiner* — Amir Alavi
(74) *Attorney, Agent, or Firm* — Shook Hardy & Bacon LLP

(57) ABSTRACT

Methods and computer-readable media for propagating content category information to images stored in a database are described. A seed image that is associated with a known content category is received. A content-based image retrieval is conducted using the seed image as a search query image. A number of search result images are identified. The content category is propagated to the search result images. Metadata associated with the search result images is aggregated and analyzed to identify domains that should also be associated with the content category. Additional images that are associated with the domain are identified and the content category propagated thereto. The process is iterated using the additional images as search query images for the content-based image retrieval.

20 Claims, 18 Drawing Sheets

U.S. PATENT DOCUMENTS

| | | | |
|---|---|---|---|
| 2007/0067345 | A1 | 3/2007 | Li et al. |
| 2007/0077987 | A1 | 4/2007 | Gururajan |
| 2007/0078846 | A1 | 4/2007 | Gulli et al. |
| 2007/0236712 | A1 | 10/2007 | Li |
| 2007/0237426 | A1 | 10/2007 | Xie |
| 2008/0144943 | A1 | 6/2008 | Gokturk |
| 2008/0226119 | A1 | 9/2008 | Candelore et al. |
| 2009/0041366 | A1 | 2/2009 | Li et al. |
| 2009/0300055 | A1 | 12/2009 | Mestha |
| 2010/0088295 | A1 | 4/2010 | Duan et al. |
| 2010/0226582 | A1* | 9/2010 | Luo et al. ............... 382/224 |
| 2011/0103699 | A1* | 5/2011 | Ke et al. ............... 382/209 |

OTHER PUBLICATIONS

Nonfinal Office Action mailed, Feb. 21, 2012, in U.S. Appl. No. 12/913,430, 32 pp.

Final Office Action in U.S. Appl. No. 12/610,810, mailed Mar. 26, 2012.

Henry A. Rowley, Google, Inc., Mountain View, CA, USA, Yushi Jing, College of Computing, Georgia Institute of Technology, Atlanta, GA, USA, and Shumeet Baluja, Google, Inc., Mountain View, CA, USA, Large Scale Image-Based Adult-Content Filtering; Feb. 28, 2006; 7 pages; http://www.cs.cmu.edu/afs/cs/usr/har/Web/visapp2006.pdf.

Shau Hong, School of Information & Engineering, Shenyang University of Technology, Shenyang, China, Cui Wen-Cheng, Network Management Center, Shenyang University of Technology, Shenyang, China, Tang Li, Software Center, Northeastern University, Shenyang, China, Medical Image Description in Content-Based Image Retrieval; Jan. 18, 2006;4 pages; http://ieeexplore.ieee.org/stamp/stamp.jsp?tp=&arnumber=1615946.

W.W. Chu, Department of Computer Science, University of California, Los Angeles, CA, USA, C.-C. Hsu, I.T. Leong, NCR Corporation, 100 N. Sepulveda Blvd., El Segundo, CA, USA, and R.K. Taira, Department of Radiological Sciences, University of California, Los Angeles, CA, USA, Content-Based Image Retrieval Using Metadata and Relaxation Techniques. 1998. 41 pages, http://www.kmed.cs.ucla.edu/papers/chap6.ps.

PCT Notification of Transmittal of the International Search Report and the written opinion of the International Searching Authority, or the Declaration, PCT/US2010/055165, Date of mailing: Jun. 28, 2011.

Chang, et al., "Columbia University TRECVID-2005, Video Search and High-Level Feature Extraction," Oct. 28, 2005, 9 pages, http://citeseerx.ist.psu.edu/viewdoc/download?doi=10.1.1.111.5794&rep=rep1&type=pdf.

http://services.alphaworks.ibm.com/featureextr?open&S T ACT=105AGX59&S CMP=GRsite-lnxw188ca=dgr-lnxw18awfeatureextr, "Feature Extraction Service for IBM Multimedia Analysis and Retrieval System," Nov. 18, 2008.

http://www.alphaworks.ibm.com/tech/imars, "IBM Multimedia Analysis and Retrieval System," Posted Feb. 28, 2005.

http://www.alphaworks.ibm.com/tech/imars/faq#01, "IBM Multimedia Analysis and Retrieval System," Posted Feb. 28, 2005.

Jing, et al., "PageRank for Product Image Search," Apr. 21-25, 2008, pp. 307-315, http://www2008.org/papers/pdf/p307-jingA.pdf.

Mingjing Li and Wei-Yung Ma, Image Search Engine—Abstract, Introduction, Web image search engine, Collection-based search engine, Content-based image retrieval, Conclusion—Retrieved Date: Oct. 22, 2009, 5 pages, http://encyclopedia.jrank.org/articles/pages/6764/Image-Search-Engine.html.

Qi Zhang, Sally A. Goldman, Wei Yu, and Jason E. Fritts, "Content-Based Image Retrieval Using Multiple-Instance Learning," Retrieved Date: Oct. 22, 2009, 8 pages, http://citeseerx.ist.psu.edu/viewdoc/download?doi=10.1.1.18.2380&rep=rep1&type=pdf.

Shih-Fu Chang and John R. Smith, "Extracting Multi-Dimensional Signal Features for Content-Based Visual Query," SPIE Symposium on Visual Communications and Signal Processing, Published Date: May 1995, 12 pages, http://www.ee.columbia.edu/In/dvmm/publications/95/chang95b.pdf.

"Xu, et al., ""Near Duplicate Identification with Spatially Aligned Pyramid Matching,"" retrieved Jun. 8, 2010, 11 pages, http://vc.sce.ntu.edu.sg/index_files/TCSVT-SAPM_Double.pdf".

Final Office Action mailed Nov. 1, 2012, in U.S. Appl. No. 12/913,430, 19 pages.

* cited by examiner

IMAGE METADATA PROPAGATION

CROSS-REFERENCE TO RELATED APPLICATIONS

This application is a continuation-in-part of co-pending U.S. patent application Ser. No. 12/610,810, filed Nov. 2, 2009, the disclosure of which is hereby incorporated herein in its entirety by reference.

BACKGROUND

Various methods for search and retrieval of information, such as by a search engine over the Internet, are known in the art. Such methods typically employ text-based searching. Text-based searching employs a search query that comprises one or more textual elements such as words or phrases. The textual elements are compared to an index or other data structure to identify webpages, documents, images, and the like that include matching or semantically similar textual content, metadata, file names, or other textual representations.

The known methods of text-based searching work relatively well for text-based documents, however they are difficult to apply to image files and data. In order to search image files via a text-based query the image file must be associated with one or more textual elements such as a title, file name, or other metadata or tags. Often a human judge is required to view and label each image separately. The search engines and algorithms employed for text based searching cannot search image files based on the content of the image and thus, are limited to identifying search result images based only on the data associated with the images.

Methods for content-based searching of images have been developed that utilize one or more analysis of the content of the images to identify visually similar images. These methods however, are laborious and may require a great deal of input from a user to characterize an image before a search can be performed. Further, such methods are inefficient and do not scale well to a large scale, wherein, for example, several billion images must be quickly searched to identify and provide search result images to a user.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Embodiments of the invention are generally directed to propagating content information to similar or related images with the aid of content-based image searching. A known seed image that is associated with a known content category is identified. A content-based image retrieval (CBIR) or search that employs the seed image as the query image is executed to identify search result images that are duplicate, similar, or modified images of the seed image. The content information of the seed image is propagated to the search result images so that they are identifiable as including such content.

Tags, labels, or other metadata associated with the search results images are aggregated and analyzed to identify common characteristics between two or more of the images, such as the domain in which the search result images are found on a network. Additional images are identified based on the common characteristics. For example, additional images from a common domain are identified. The content information of the seed image is propagated to the additional images. The process iterates using the additional images as seed images to further identify images with similar content and to propagate the content information to those images. Thereby, images are tagged or labeled with content information to aid in searching, filtering, and organizing, among other operations on the images.

DESCRIPTION OF THE DRAWINGS

Illustrative embodiments of the invention are described in detail below with reference to the attached drawing figures, and wherein.

DETAILED DESCRIPTION

Figure 1:
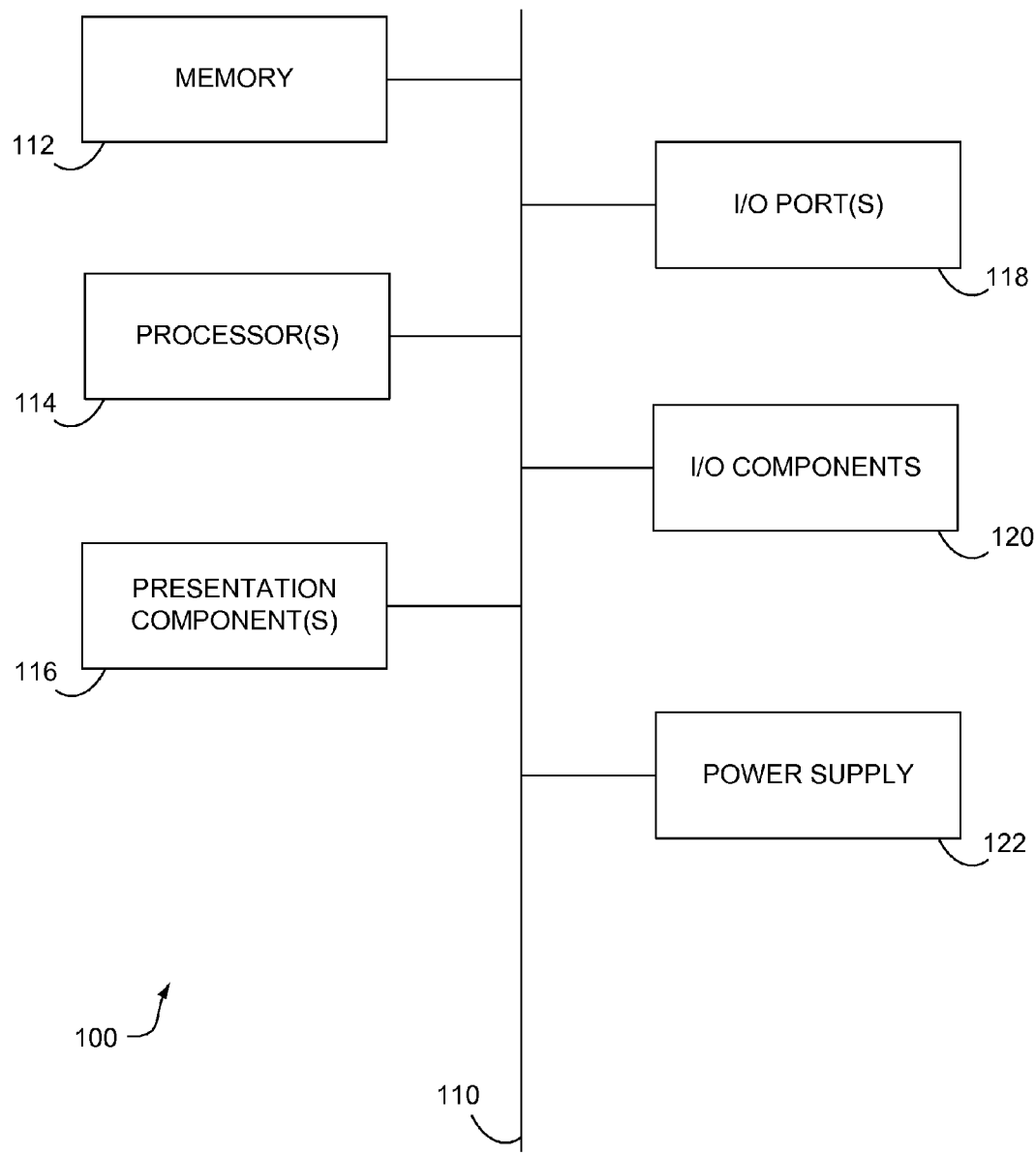
FIG. 1 is a block diagram depicting an exemplary computing device suitable for use in embodiments of the invention.

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention include methods and computer-readable media for propagating image metadata. The propagation of the image metadata may be employed to aid in identifying search result images via content-based image retrieval (CBIR) searching, text-based searching, or a combination of CBIR and text-based searching. The image metadata is also useable for filtering of search results and for categorizing network domains, among other uses.

As described in the co-pending U.S. patent application Ser. No. 12/610,810 incorporated by reference above, content-based image search analyzes and employs the actual content of an image to perform a search for visually similar images. The image content may include one or more of the colors, textures, shading, shapes, or other characteristics or information that can be derived from an image. Content-based image search may also be described as content-based image retrieval (CBIR), query by image content (QBIC), or content-based visual information retrieval (CBVIR) as is known in the art. The terms content-based image search, content-based image retrieval, and CBIR are used interchangeably throughout this discussion. In embodiments, additional text-based information regarding an image and its content is acquired from various sources, as described below, to inform the content-based search and to perform additional text-based searches in parallel to the content-based search.

In an embodiment, a computer-implemented method for propagating image metadata is described. A seed image associated with a content category is received. A content-based image retrieval is conducted to identify search result images stored in a database. Image metadata associated with the seed images is propagated to the search result images. A common characteristic is identified between at least two of the search result images. An additional image that is not one of the search result images and that shares the common characteristic is identified. The image metadata associated with the seed images is propagated to the additional image.

In another embodiment, computer-readable media having computer-executable instructions embodied thereon that, when executed, perform a method for filtering search results based on a content category associated therewith is described.

By the method a content category is associated with candidate images by propagating content category data associated with seed images to the one or more candidate images. The content category data is propagated by performing a content-based image retrieval based on the seed images to identify retrieved images. Content category data for the seed images is propagated to the retrieved images. A domain to which a retrieved image belongs is identified. An additional image in the domain is identified. The image category data associated with the seed images is propagated to the additional image. The candidate images are indexed and stored in databases and include the seed images, retrieved images, and additional image. An indication of a desired content category and/or an undesired content category is received. A search query is received. Search query results that are associated with the desired content category and/or not associated with the undesired content category are identified.

In another embodiment, a method for categorizing network domains is described. A seed image associated with a content category is received. A descriptor identifier associated with each of a plurality of interest points in the seed image is determined. An interest point comprises one of a point, a region, or an area in the seed image that is identified by an operator algorithm. The seed image is represented as a first set of descriptor identifiers. A content-based image retrieval is conducted to identify search result images stored in one or more databases by searching a plurality of indexed images in the one or more databases by comparing the first set of descriptor identifiers with one or more second sets of descriptor identifiers associated with the indexed images to identify the search result images. The content category associated with the seed image is propagated to the search result images. A domain to which one or more of the search result images belongs is identified. The domain is associated with the content category. An additional image in the domain is identified. The content category associated with the seed image is propagated to the additional image. One or more subsequent content-based image retrievals are conducted using the additional image or a subsequent additional image as a seed image to associate the content category with subsequent domains and subsequent additional images.

Referring initially to FIG. 1 in particular, an exemplary computing device for implementing embodiments of the invention is shown and designated generally as computing device 100. The computing device 100 is but one example of a suitable computing device and is not intended to suggest any limitation as to the scope of use or functionality of invention embodiments. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, the computing device 100 includes a bus 110 that directly or indirectly couples the following devices: a memory 112, one or more processors 114, one or more presentation components 116, input/output ports 118, input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. It is recognized that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "hand-held device," etc., as all are contemplated within the scope of FIG. 1 and reference to "computing device."

The computing device 100 typically includes a variety of computer-readable media. By way of example, and not limitation, computer-readable media may comprises Random-Access Memory (RAM); Read-Only Memory (ROM); Electronically Erasable Programmable Read Only Memory (EEPROM); flash memory or other memory technologies; compact disc read-only memory (CD-ROM), digital versatile disks (DVD) or other optical or holographic media; magnetic cassettes, magnetic tape, magnetic disk storage or other magnetic storage devices, or any other medium that can be used to encode desired information and be accessed by the computing device 100.

The memory 112 includes computer-storage media in the form of volatile and/or nonvolatile memory. The memory 112 may be removable, nonremovable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components 116 include a display device, speaker, printing component, vibrating component, etc.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
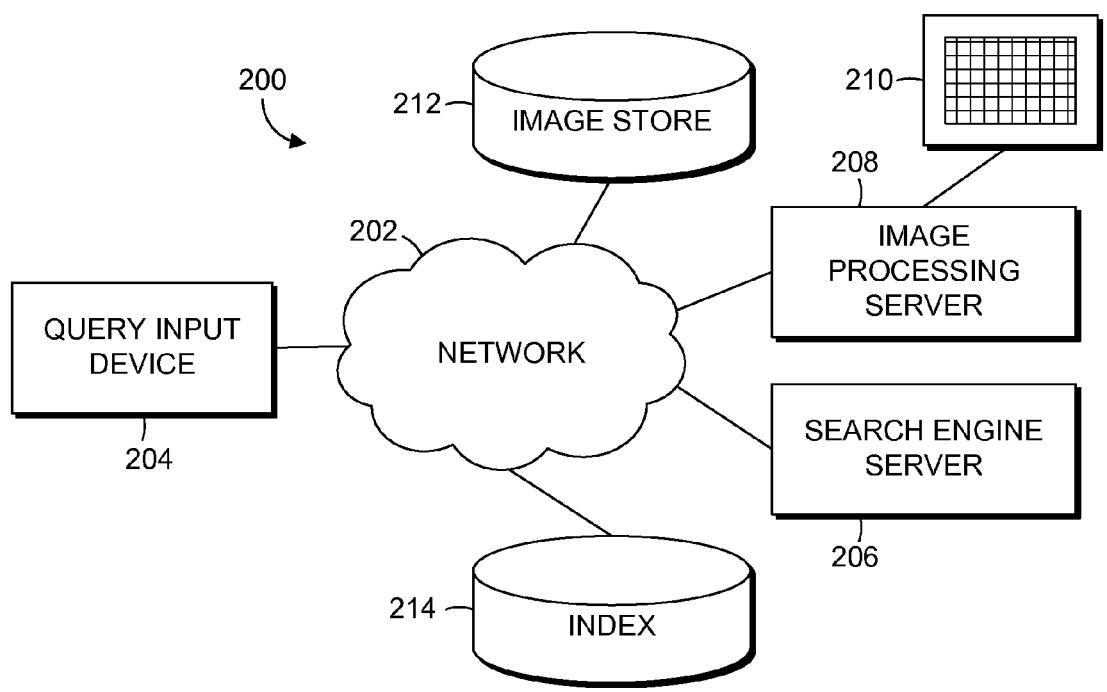
FIG. 2 is a block diagram depicting an exemplary network environment suitable for use in embodiments of the invention.

With additional reference to FIG. 2, a block diagram depicting an exemplary network environment 200 suitable for use in embodiments of the invention is described. The environment 200 is but one example of an environment that can be used in embodiments of the invention and may include any number of components in a wide variety of configurations. The description of the environment 200 provided herein is for illustrative purposes and is not intended to limit configurations of environments in which embodiments of the invention can be implemented.

The environment 200 includes a network 202, a query input device 204, and a search engine server 206. The network 202 includes any computer network such as, for example and not limitation, the Internet, an intranet, private and public local networks, and wireless data or telephone networks. The query input device 204 is any computing device, such as the computing device 100, from which a search query can be provided. For example, the query input device 204 might be a personal computer, a laptop, a server computer, a wireless phone or device, a personal digital assistant (PDA), or a digital camera, among others. In an embodiment, a plurality of query input devices 204, such as thousands or millions of query input devices 204, are connected to the network 202.

The search engine server 206 includes any computing device, such as the computing device 100, and provides at least a portion of the functionalities for providing a content-based search engine. In an embodiment a group of search engine servers 206 share or distribute the functionalities required to provide search engine operations to a user population.

An image processing server 208 is also provided in the environment 200. The image processing server 208 includes any computing device, such as computing device 100, and is configured to analyze, represent, and index the content of an image as described more fully below. The image processing server 208 includes a quantization table 210 that is stored in a memory of the image processing server 208 or is remotely accessible by the image processing server 208. The quantization table 210 is used by the image processing server 208 to inform a mapping of the content of images to allow searching and indexing as described below.

The search engine server 206 and the image processing server 208 are communicatively coupled to an image store 212 and an index 214. The image store 212 and the index 214 include any available computer storage device, or a plurality thereof, such as a hard disk drive, flash memory, optical memory devices, and the like. The image store 212 provides data storage for image files that may be provided in response to a content-based search of an embodiment of the invention. The index 214 provides a search index for content-based searching of the images stored in the image store 212. The index 214 may utilize any indexing data structure or format, and preferably employs an inverted index format.

An inverted index provides a mapping depicting the locations of content in a data structure. For example, when searching a document for a particular word, the word is found in the inverted index which identifies the location of the word in the document, rather than searching the document to find locations of the word.

In an embodiment, one or more of the search engine server 206, image processing server 208, image store 212, and index 214 are integrated in a single computing device or are directly communicatively coupled so as to allow direct communication between the devices without traversing the network 202.

Figure 3:
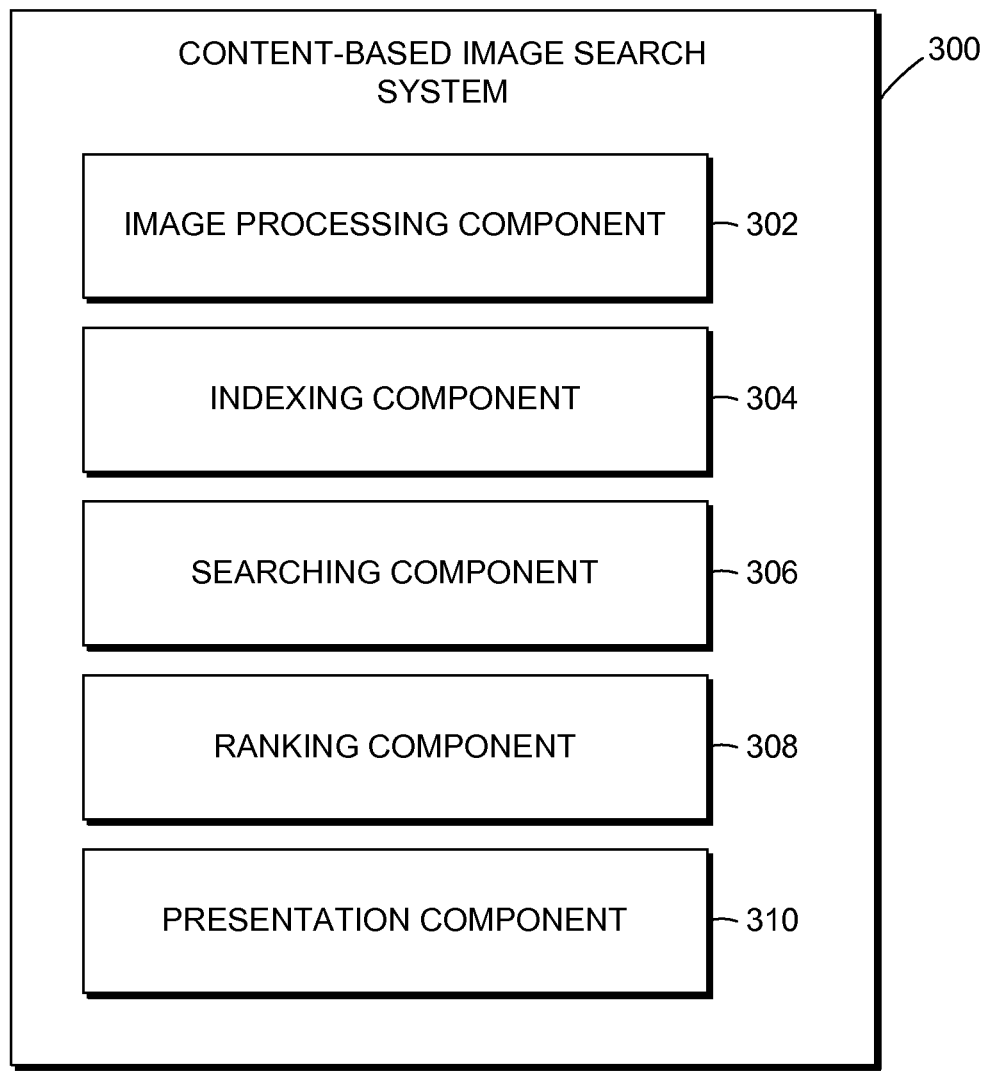
FIG. 3 is a block diagram depicting a system for content-based image search in accordance with an embodiment of the invention.

Referring now to FIG. 3 a system 300 for content-based image search in accordance with an embodiment of the invention is described. The system 300 may be embodied in and distributed over one or more computing devices and components, such as the search engine server 206, the image processing server 208, the quantizing table 210, image store 212 and the index 214 described above with respect to FIG. 2. The system 300 includes an image processing component 302, an indexing component 304, a searching component 306, a ranking component 308, and a presentation component 310. In another embodiment, the system 300 may include additional components, sub-components, or combinations of one or more of the components 302-310.

The image processing component 302 receives and processes images for content-based image searching. An image is received from a user via a computing device, such as the query input device 204, as a search query or as an upload of the image to a data store, such as image store 212. The image may also be received or collected from one or more other computing devices in communication with the network 202.

The image, or images, received by the image processing component 302 are in any electronic image format such as, for example and not limitation, raster formats including Joint Photographic Experts Group (JPEG), bitmap (BMP), tagged image file format (TIFF), and raw image format (RAW), vector formats including computer graphic metafile (CGM) and scalable vector graphics (SVG), and three-dimensional formats such as portable network graphics stereo (PNS), JPEG stereo (JPS), or multi-picture object (MPO), among other formats. The characteristics, such as image size, color scheme, resolution, quality, and file size of the image are not limited. The media portrayed in the images is also not limited and may include for instance, photographs, works of art, drawings, scanned media, and the like. Further, the content or subject matter portrayed in the images is not limited. Additionally, in an embodiment the image(s) might include video files, audio-video, or other multimedia files.

With additional reference now to FIGS. 12-16, the processing of an exemplary image 1200 by the system 300 is described in accordance with an embodiment of the invention. In an embodiment, to process the received image 1200, the image processing component 302 employs an operator algorithm. The operator algorithm identifies a plurality of interest points 1202 in the image 1200. The operator algorithm includes any available algorithm that is useable to identify interest points 1202 in the image 1200. In an embodiment, the operator algorithm is a difference of Gaussians algorithm or a Laplacian algorithm as are known in the art. In an embodiment, the operator algorithm is configured to analyze the image 1200 in two dimensions. Additionally, in another embodiment, when the image 1200 is a color image, the image 1200 is converted to grayscale.

Figure 12:
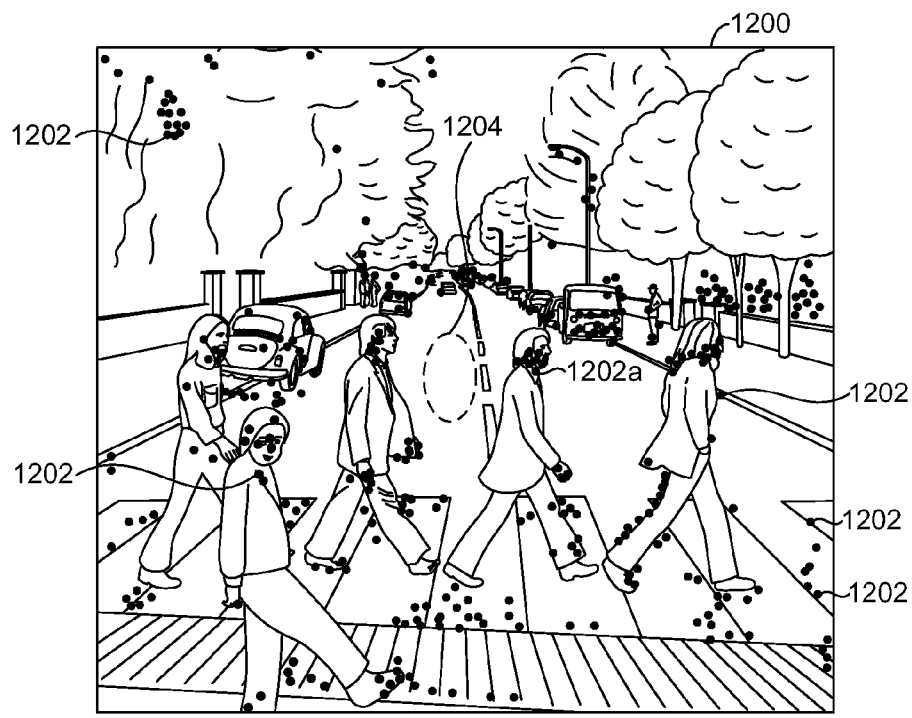
FIG. 12 is a line drawn representation of a graphical image depicting a plurality of interest points in the image in accordance with an embodiment of the invention.
Figure 13:
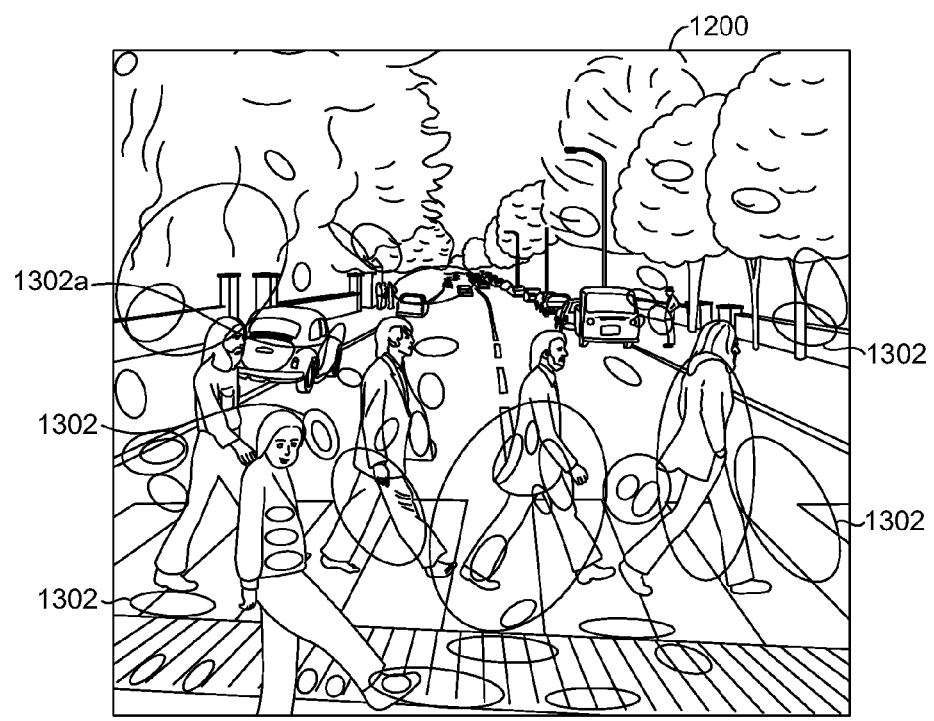
FIG. 13 is a line drawn representation of a graphical image depicting regions around interest points in the image in accordance with an embodiment of the invention.

An interest point 1202 includes any point in the image 1200 as depicted in FIG. 12, as well as a region 1302, area, group of pixels, or feature in the image 1200 as depicted in FIG. 13. The interest points 1202 and regions 1302 are referred to hereinafter as interest points 1202 for sake of clarity and brevity, however reference to the interest points 1202 is intended to be inclusive of both interest points 1202 and the regions 1302. In an embodiment, an interest point 1202 is located on an area in the image 1200 that is stable and includes a distinct or identifiable feature in the image 1200. For example, an interest point 1202 is located on an area of an image having sharp features with high contrast between the features such as depicted at 1202a and 1302a. Conversely, an interest point is not located in an area with no distinct features or contrast, such as a region of constant color or grayscale as indicated by 1204.

The operator algorithm identifies any number of interest points 1202 in the image 1200, such as, for example, thousands of interest points. The interest points 1202 may be a combination of points 1202 and regions 1302 in the image 1200 and the number thereof may be based on the size of the image 1200. The image processing component 302 computes a metric for each of the interest points 1202 and ranks the interest points 1202 according to the metric. The metric might include a measure of the signal strength or the signal to noise ratio of the image 1200 at the interest point 1202. The image processing component 302 selects a subset of the interest points 1202 for further processing based on the ranking. In an embodiment, the one hundred most salient interest points 1202 having the highest signal to noise ratio are selected, however any desired number of interest points 1202 may be selected. In another embodiment, a subset is not selected and all of the interest points are included in further processing.

Figure 14:
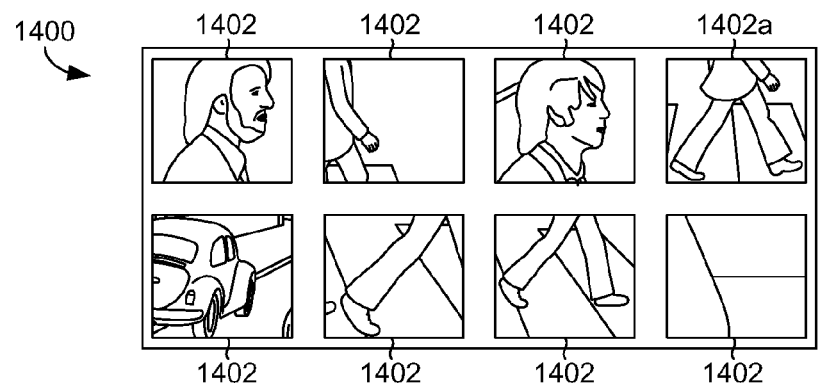
FIG. 14 is a line drawn representation of a set of patches determined from the image of FIG. 13 in accordance with an embodiment of the invention.
Figure 15:
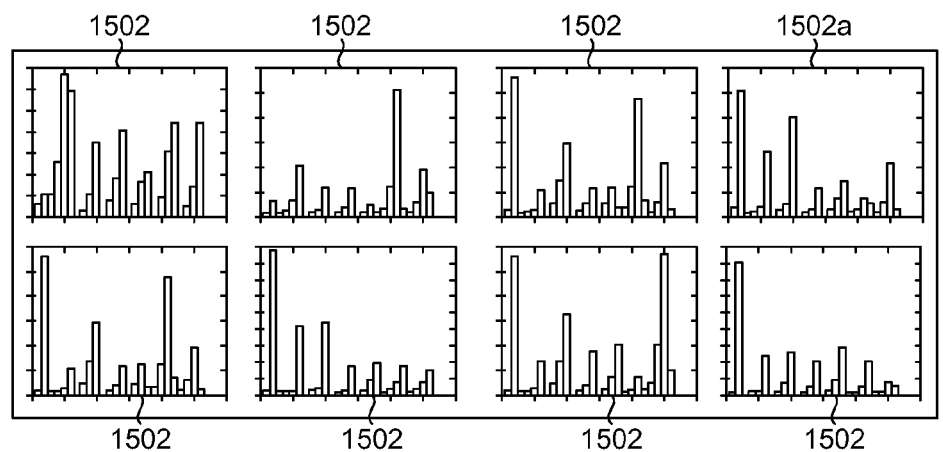
FIG. 15 is a representation of a set of descriptor histograms determined from the set of patches of FIG. 14 in accordance with an embodiment of the invention.

As depicted in FIG. 14, the image processing component 302 identifies a set of patches 1400 corresponding to the selected interest points 1202. Each patch 1402 corresponds to a single selected interest point 1202. The patches 1402 include an area of the image 1200 that includes the respective interest point 1202. The size of each patch 1402 to be taken from the image 1200 is determined based on an output from the operator algorithm for each of the selected interest points 1202. Each of the patches 1402 may be of a different size and the areas of the image 1200 to be included in the patches 1402 may overlap. Additionally, the shape of the patches 1402 is any desired shape including a square, rectangle, triangle, circle, oval, or the like. In the illustrated embodiment, the patches 1402 are square in shape.

The image processing component 302 normalizes the patches 1402 as depicted in FIG. 14. In an embodiment, the patches 1402 are normalized to conform each of the patches 1402 to an equal size, such as an X pixel by X pixel square patch. Normalizing the patches 1402 to an equal size may include increasing or decreasing the size and/or resolution of a patch 1402, among other operations. The patches 1402 may also be normalized via one or more other operations such as applying contrast enhancement, despeckling, sharpening, and applying a grayscale, among others.

The image processing component 302 also determines a descriptor for each normalized patch. A descriptor is determined by calculating statistics of the pixels in the patch 1402. In an embodiment, a descriptor is determined based on the statistics of the grayscale gradients of the pixels in a patch 1402. The descriptor might be visually represented as a histogram for each patch, such as a descriptor 1502 depicted in FIG. 15 (wherein the patches 1402 of FIG. 14 correspond with similarly located descriptors 1502 in FIG. 15). The descriptor might also be described as a multi-dimensional vector such as, for example and not limitation, a T2S2 36-dimensional vector that is representative of the pixel grayscale statistics.

Figure 16:
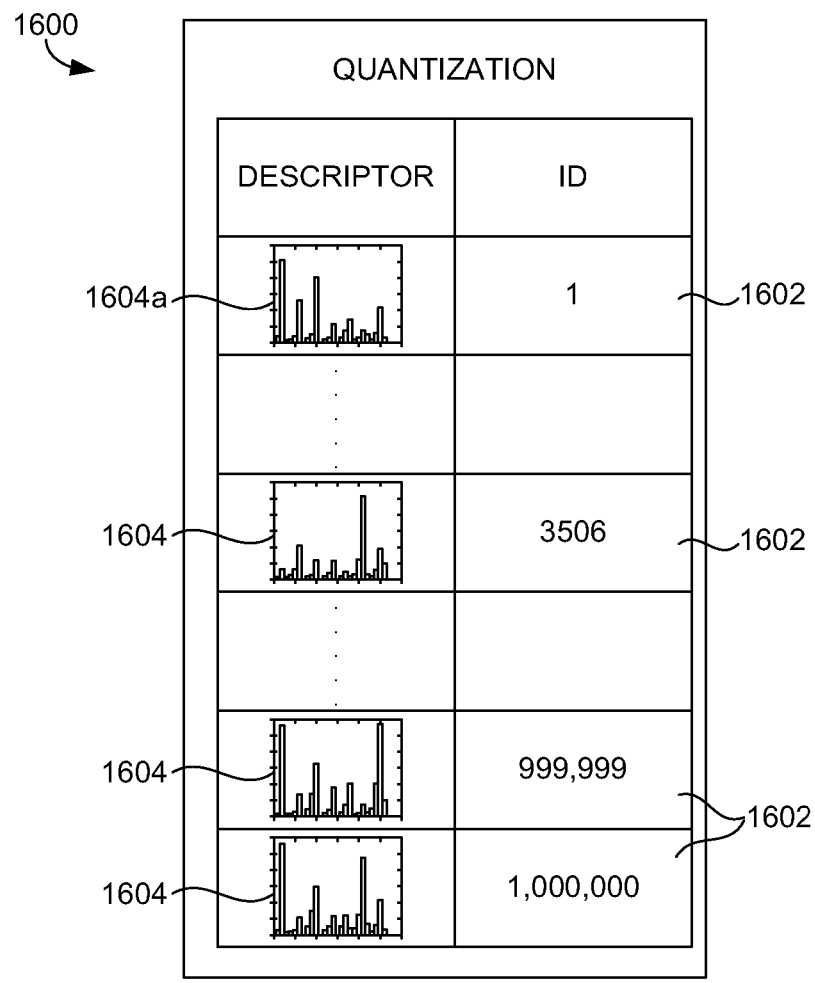
FIG. 16 is a representation of a quantization table suitable for use in embodiments of the invention.

As depicted in FIG. 16, a quantization table 1600 is employed by the image processing component 302 to identify a descriptor identifier 1602 for each descriptor 1502. The quantization table 1600 includes any table, index, chart, or other data structure useable to map the descriptors 1502 to the descriptor identifiers 1602. Various forms of quantization tables 1600 are known in the art and are useable in embodiments of the invention. In an embodiment, the quantization table 1600 is generated by first processing a large quantity of images (e.g. image 1200), for example a million images, to identify descriptors 1502 for each image. The descriptors 1502 identified therefrom are then statistically analyzed to identify clusters or groups of descriptors 1502 having similar, or statistically similar, values. For example, the values of variables in T2S2 vectors are similar. A representative descriptor 1604 of each cluster is selected and assigned a location in the quantization table 1600 as well as a corresponding descriptor identifier 1602. The descriptor identifiers 1602 include any desired indicator that is useable by the system 300 to identify a corresponding representative descriptor 1604. For example, the descriptor identifiers 1602 include integer values as depicted in FIG. 16, or alpha-numeric values, numeric values, symbols, and text.

The image processing component 302 identifies, for each descriptor 1502, a most closely matching representative descriptor 1604 in the quantization table 1600. For example, a descriptor 1502a depicted in FIG. 15 most closely corresponds with a representative descriptor 1604a of the quantization table 1600 in FIG. 16. The descriptor identifiers 1602 for each of the descriptors 1502 are thereby associated with the image 1200 (e.g. the descriptor 1502a corresponds with the descriptor identifier 1602 "1"). The descriptor identifiers 1602 associated with the image 1200 may each be different from one another or one or more of the descriptor identifiers 1602 may be associated with the image 1200 multiple times (e.g. the image 1200 might have descriptor identifiers 1602 of "1, 2, 3, 4" or "1, 2, 2, 3"). In an embodiment, to take into account characteristics, such as image variations, a descriptor 1502 may be mapped to more than one descriptor identifier 1602 by identifying more than one representative descriptor 1604 that most nearly matches the descriptor 1502 and the respective descriptor identifier 1602 therefor. As such, the image processing component 302 provides a set of descriptor identifiers 1602 that represent the content of the image 1200 based on the set of identified interest points 1202.

With continued reference to FIG. 3, the indexing component 304 indexes the descriptor identifiers 1602 and stores the index to a memory, such as the index 214. In an embodiment, the indexing component 304 employs a flat index location space on which to base the indexing. A flat index location space (hereinafter "flat index") is a one dimensional listing or array in which the descriptor identifiers 1602 are sequentially listed. A location identifier is also provided for each descriptor identifier 1602 listed in the flat index that indicates the location of the respective descriptor identifier 1602 in the flat index. The descriptor identifiers 1602 for the image 1200 are listed sequentially and grouped together in the flat index.

An end-of-document identifier is provided by the index component 304 sequentially following the descriptor identifiers 1602 for the image 1200. The end-of-document identifier is also provided with a location identifier and is useable to indicate the end of a group of descriptor identifiers 1602 associated with a particular image 1200. As such, when the descriptor identifiers 1602 for a plurality of images 1200 are indexed in the flat index the descriptor identifiers 1602 for each image 1200 are grouped together and separated from the descriptor identifiers 1602 of another image 1200 by an end-of-document identifier located therebetween.

For example, an exemplary set of five images (e.g. image 1200) and their respective descriptor identifiers (e.g. descriptor identifiers 1602) are listed in Table 1. The descriptor identifiers in Table 1 are alpha characters, however the descriptor identifiers may use any number, symbol, or character as described above. Table 2 depicts a flat index representation of the five images indicating a location for each descriptor identifier in the flat index as well as end-of-document identifiers between the descriptor identifiers for each image.

TABLE 1

Exemplary Images

| Image | Descriptor Identifier |
|---|---|
| 1 | a, f, d |
| 2 | d, d |
| 3 | d, e |
| 4 | c, n, a, b, d |
| 5 | m, e |

TABLE 2

Flat Index Location Space

| | Descriptor Identifier | | | | | | | | | | | | | | | | | | |
|---|---|---|---|---|---|---|---|---|---|---|---|---|---|---|---|---|---|---|---|
| | a | f | d | * | d | d | * | d | e | * | c | n | a | b | d | * | m | e | * |
| Location Identifier | 1 | 2 | 3 | 4 | 5 | 6 | 7 | 8 | 9 | 10 | 11 | 12 | 13 | 14 | 15 | 16 | 17 | 18 | 19 |

In an embodiment, the indexing component 304 also determines an inverted index, such as the index 214, based on the flat index. The inverted index includes a data structure that provides a listing of all of the descriptor identifiers listed in the flat index and/or included in the quantization table 1600 described above. The locations at which each of the descriptor identifiers occurs in the flat index are indicated with respect to the descriptor identifiers. For example, Table 3 depicts an inverted index listing of the flat index of Table 2 in accordance with an embodiment of the invention. The end-of-document ("EDOC") locations are also indicated in the inverted index.

TABLE 3

Inverted Index

| Descriptor Identifier | Location |
|---|---|
| a | 1, 13 |
| b | 14 |
| c | 11 |
| d | 3, 5, 6, 8, 15 |
| e | 9, 18 |
| f | 2 |
| g | — |
| h | — |
| ... | ... |
| m | 17 |
| n | 12 |
| EDOC | 4, 7, 10, 16, 19 |

As such, the indexing component 304 can index a plurality of images based on their descriptor identifiers. In an embodiment, the indexing component 304 provides indexing for billions of images stored in one or more data stores, such as image store 212. As described previously with respect to FIG. 2, the index provided by the indexing component 304 is stored in a computer memory, such as the index 214. Additionally, the indexing component 304 may generate more than one index for the one or more data stores of images.

With continued reference to FIG. 3, the searching component 306 provides efficient content-based search. In an embodiment, the searching component 306 employs the inverted index to perform an efficient partial-matching content-based image search. The system 300 receives a search query from a user or other computing device. In an embodiment, the search query may be an image, such as the image 1200. The system 300, via the image processing component 302 described above, identifies descriptor identifiers 1602 that are representative of the image 1200. The searching component 306 performs an efficient partial-matching search for images stored in the image store(s) and indexed in the inverted index(es) based on the descriptor identifiers 1602 identified as representative of the image 1200. The search is described hereinafter with respect to a single index and image store for sake of clarity and simplicity, however such is not intended to limit applications of embodiments of the invention to a single index and image store.

To perform the partial-matching search, a minimum number ("M") of matching descriptor identifiers that an indexed image (e.g. an image stored in the image store and whose descriptor identifiers are indexed in the inverted index) must have to be considered a candidate image (e.g. possible search result) is identified. The minimum number M is predetermined based on factors such as the number of candidate images that are desired to be identified as candidate images, among other factors. In an embodiment, the minimum number M is predetermined by an administrator or a user.

The searching component 306 traverses the inverted index to identify location identifiers for each of the descriptor identifiers 1602 of the image 1200 that have the lowest values. The lowest values are compared to identify the M lowest of those values. The searching component 306 also determines an end-of-document location identifier ("EDOC-end") having the lowest value that is greater than the value of the highest location identifier value of the M lowest values. The EDOC-end location identifier identifies an indexed image whose descriptor identifiers directly precede the EDOC-end location identifier in the flat index location space. Further, the lower location bound ("start-of-document") of the indexed image (e.g. the first descriptor identifier location listed for the indexed image) can be determined by identifying the previous EDOC location identifier value and then moving one value up. As such, the searching component 306 identifies that the M lowest values must occur between the location identifier value for the start-of-document and the EDOC-end location identifier value, inclusive of the start-of-document location identifier value. When the searching component 306 determines that the M lowest values do lie within the identified location identifier values the respective indexed image is returned as a candidate image.

When the searching component 306 determines that the M lowest values do not lie within the start-of-document and EDOC-end location identifier values a second iteration of the process is completed to identify the next set of M lowest values. For example, the location identifier for the descriptor identifier 1602 having the lowest location identifier value may be incremented to the next indexed location identifier value and the M lowest values reassessed. The process is repeated until the inverted index is fully traversed.

Continuing with the exemplary images depicted in Tables 1-3 above, an exemplary iteration of the processes of the searching component 306 is described. Assuming for sake of example a search query is received comprising an image that is represented by query descriptor identifiers a, d, h, g, n. Additionally, it is assumed that two (2) descriptor identifiers must match with an indexed image to return the indexed image as a candidate image (e.g. M=2). Based on the inverted index provided in Table 3, the lowest values of the location identifiers for the query descriptor identifiers representing the search query image are:

TABLE 4a

| Search, First Iteration | |
| --- | --- |
| Descriptor Identifier | Lowest Location Identifier Value |
| a | 1 |
| d | 3 |
| n | 12 |
| EDOC | 4 |

Thus, the searching component 306 determines that the two lowest location identifier values are 1 and 3 and that the lowest location identifier value for the EDOC that is larger than the largest location identifier value of the M lowest location identifier values is 4 (EDOC-end=4). Further, the start-of-document location identifier value is 1. Therefore, the values 1 and 3 are between the start-of-document and EDOC-end (inclusive of the start-of-document location identifier value) and the indexed image represented by the descriptor identifiers in locations 1-3, Image 1, is returned as a candidate image.

Continuing this example, once Image 1 is returned, the value of the EDOC-end location identifier is moved to its next location identifier value, 7 (e.g. current EDOC-end=7). The current start-of-document is set to one more than the previous value of EDOC-end (start-of-document=4+1=5). The location identifier values of the descriptor identifiers a and d are incremented to their next location identifier values not less than the start-of-document location identifier value respectively, because they were included in the indexed image that was returned as a candidate image. Additionally, although not depicted in this example, if there were any query descriptor identifiers having location identifier values less than the start-of-document location identifier value, the location identifier values of those query descriptor identifiers would also be incremented to their next value that is not less that the start-of-document location identifier value. The location identifier value of the descriptor identifier n is not incremented because its value was greater than the start-of-document location identifier value. Thus, the next set of lowest location identifier values depicted in Table 3 above is:

TABLE 4b

| Search, Second Iteration | |
| --- | --- |
| Descriptor Identifier | Lowest Location Identifier Value |
| a | 13 |
| d | 5 |
| n | 12 |
| EDOC | 7 |

The searching component 306 identifies that there are no two location identifier values that are less than the EDOC location identifier value and thus, increments the EDOC location identifier value to the next lowest value listed in the inverted index that is greater that the lowest two location identifier values listed in the inverted index; in this example the EDOC location identifier value is incremented to 16 (EDOC-end=16). The start-of-document is identified to be 11 (e.g. one location larger than the next smaller EDOC value in the inverted index). The searching component 306 determines that two location identifier values, 13 and 12, lie between the start-of-document and EDOC-end location identifier values (inclusive of the start-of-document location identifier value) and thus, the indexed image represented by the descriptor identifiers listed in locations 11 through 15, Image 4, is returned as a candidate image. The searching component 306 continues this process until the entire inverted index is traversed.

The process of the searching component 306 efficiently searches the inverted index by employing the end-of-document location identifiers to allow skipping of images that do not include at least M matching descriptor identifiers. For instance, in the example described above with respect to Tables 1-4, the descriptor identifiers for Images 2 and 3 were skipped. Following the first iteration depicted in Table 4a, the next possible matching indexed image was identified as Image 4. As such, it was not necessary for the searching component 306 to consider the descriptor identifiers for Images 2 and 3. The advantages of the above partial-matching search are realized on a much greater scale in embodiments of the invention that are applied to large scale image storage and retrieval. For example, where the searching component 306 is tasked with searching several billion images and the minimum number of matching descriptor identifiers is ten (10) out of one hundred (100) descriptor identifiers stored for each indexed image, the ability to skip or quickly identify indexed images that do not include the minimum number of matching descriptor identifiers greatly increases the efficiency of the search.

In another embodiment, the minimum number, M, of matching descriptor identifiers is adjusted during the search process. A total or maximum number of search result images ("K") that are to be provided in response to a search query is identified. The minimum number, M, of matching descriptor identifiers may be set to any predetermined value including zero. The searching component 306 traverses the index to identify at least K indexed images having at least M matching descriptor identifiers with the search image, as described above.

The total number of matching descriptor identifiers for each of the K identified indexed images is tracked. The total number of matching descriptor identifiers for each of the K identified indexed images is compared to determine the lowest total number of matching descriptor identifiers ("L") for the K identified indexed images. In another embodiment, the lowest total number of matching descriptor identifiers, L, for the group of K identified indexed images is tracked rather than tracking and comparing the value for each individual indexed image of the K identified indexed images. The value of M is set equal to L which may be equal, to or greater than, the previous value of M.

Further, when an additional indexed image is identified by the searching component 306 that has at least M matching descriptor identifiers (where M is now equal to L), the additional indexed image is added to the group of the K identified indexed images and the indexed image in the group having the least number of matching descriptor identifiers is removed from the group. The value of L is recalculated for the group, and M is set equal to the new value. As such, the value of M is increased during the searching process based on the number of matching descriptor identifiers found in the top K identified indexed images. Thus, the efficiency of the searching process is increased as the searching process continues because more indexed images can be skipped based on the increasing value of M.

For example, assume M is initially set equal to ten (10) and that the searching component 306 identifies the first K indexed images in the index that have at least 10 matching descriptor identifiers. The searching component 306 also determines that all of the K identified indexed images actually have at least 32 matching descriptor identifiers. Thus, L is equal to 32 and M is then set equal to 32. As the searching component 306 continues the searching process the indexed images must now have at least 32 matching descriptor identifiers. The searching process continues and the value of M may be continually increased as the minimum total number of matching descriptor identifiers for the group, L, increases, as described above.

The searching component 306 may employ any available operations and data handling functionalities to aid in traversing the inverted index. In an embodiment, the searching component 306 employs a dynamic memory allocation, such as a heap, and operations associated therewith to aid in processing a search. Additionally, one or more searching components 306 can be employed to search multiple inverted indexes associated with chunks of memory storage for indexed images.

In another embodiment, the searching component 306 receives textual search elements, tags, and/or metadata with an image search query. The searching component 306 employs the textual search elements in any available manner to perform additional text-based searches and/or to inform the content-based search.

In another embodiment, one or more textual search elements, such as a textual word, are associated with one or more descriptor identifiers. As such, when the searching component 306 receives a search query that comprises an image and that is represented by the one or more descriptor identifiers associated with the textual search elements, the searching component 306 performs an additional text-based search based on the textual search elements. Alternatively, or in addition, when the textual search elements that are associated with one or more descriptor identifiers are received by the searching component 306, the searching component identifies the descriptor identifiers associated with the textual search elements and provides a content-based search for images containing the associated descriptor identifiers.

Additionally, in an embodiment, textual search elements including metadata, tags, and other information received with a search query or associated with descriptor identifiers are used to select and present paid listings, such as advertisements, banner ads, paid search results, and the like. The textual search elements may be used to identify paid listings directly or to identify categories, context, subject matter, or another characteristic of the search query that is useable to select one or more paid listings for presentation in response to the search query. Similarly, the descriptor identifiers received with the search query or identified therefrom may be used to identify paid listings directly or to identify categories, and the like that are useable to select a paid listing in response to the search query.

The indexed images that are returned as candidate images are next processed by the ranking component 308. Any available method or characteristic and combinations thereof can be used to rank the candidate images. Further, any desired operations including truncating ranked listing of candidate images may also be utilized. In an embodiment, the candidate images are ranked based on a total number of descriptor identifiers 1602 of the search image 1200 that match the descriptor identifiers of the candidate image. The ranked listing of candidate images is then truncated to remove candidate images that include the fewest number of matching descriptor identifiers and thus are least likely to be visually similar to the search image 1200.

In an embodiment, the ranking component 308 performs term frequency ranking and one or more geometric verifications and transformations on the candidate images and/or their respective descriptor identifiers. The transformations may include two- or three-dimensional transformations such as, for example and not limitation, a similarities transformation or an affine transformation. The transformations allow the ranking component 308 to further analyze the candidate images and descriptor identifiers therefore to re-rank, sort, or narrow the group of candidate images.

In an embodiment, in addition to the image content of the search image 1200 and the candidate images, the ranking component identifies one or more data elements associated with the search image 1200 or one or more of the candidate images to aid or inform the ranking of the candidate images. For example, a search image 1200 might be received along with one or more metadata data elements associated with the image 1200 or with one or more textual search elements. Such data elements and search elements further inform the ranking component 308 regarding the context of the search and the user's intent or interests in performing the search. Alternatively, or in addition, one or more of the candidate images have metadata or other data elements associated therewith that are useable by the ranking component 308 to aid in ranking the candidate images.

The ranked candidate images are configured and arranged by the presentation component 310. The presentation component 310 presents the candidate images as search result images via a user interface to a user and may incorporate any associated paid search results into the presentation thereof. In an embodiment, the search result images are presented to a user at a computing device, such as the query input device 204, via a search results webpage. The user can then select one or more of the search result images to view the images or be directed to a webpage on which the search result image is published, among a variety of other user interactions available in the art. Additionally, where additional text-based searching is performed based on textual search elements, metadata, or otherwise, the presentation component may also present text-based search results and paid listings to the user.

Figure 4:
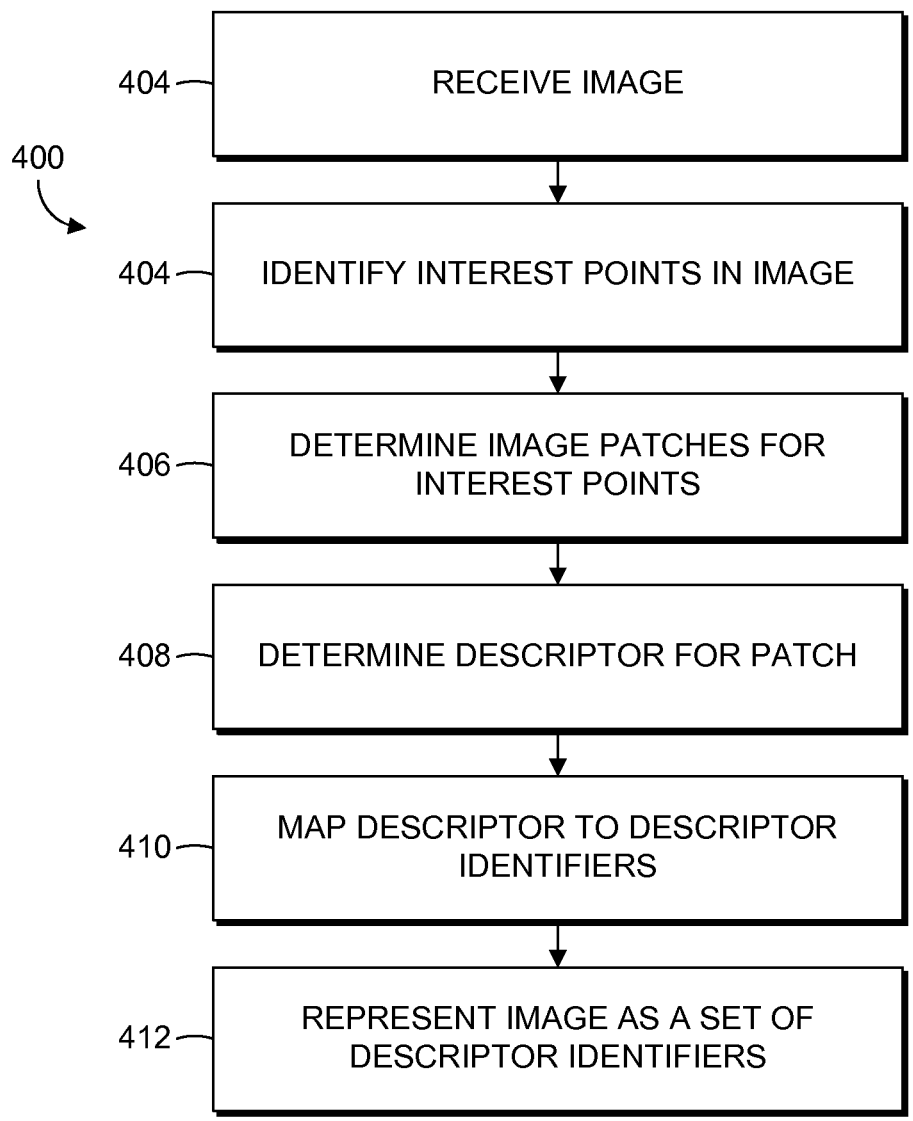
FIG. 4 is a flow diagram depicting a method for generating a representation of the content of an image for content-based image searching in accordance with an embodiment of the invention.

Referring now to FIG. 4 a flow diagram depicting a method 400 for generating a representation of the content of an image for content-based image searching in accordance with an embodiment of the invention is described. At 402 an image, such as the image 1200, is received. Interest points, such as the interest points 1202 are identified in the image through the use of an operator algorithm, as indicated at 404.

An image patch is determined for one or more of the interest points as described previously above and as indicated at 406. The image patch includes an area of the image that is inclusive of the respective interest point and may overlap other patches determined from the image. A descriptor is determined for each patch, as indicated at 408. The descriptors are descriptive of the characteristics of the pixels of the image included in the patch. For example, the descriptors describe the grayscale or color gradients of the pixels in the patch or describe a statistical analysis of the pixels.

At 410, the descriptors are each mapped to a descriptor identifier corresponding to a most closely similar representative descriptor in a quantization table. The image is represented as a set of descriptor identifiers, as indicated at 412. As such, the content of the image is quantified in a manner that allows the content to be compared by a computing device to the similarly quantified content of other images in order to identify images that are visually similar.

Figure 5:
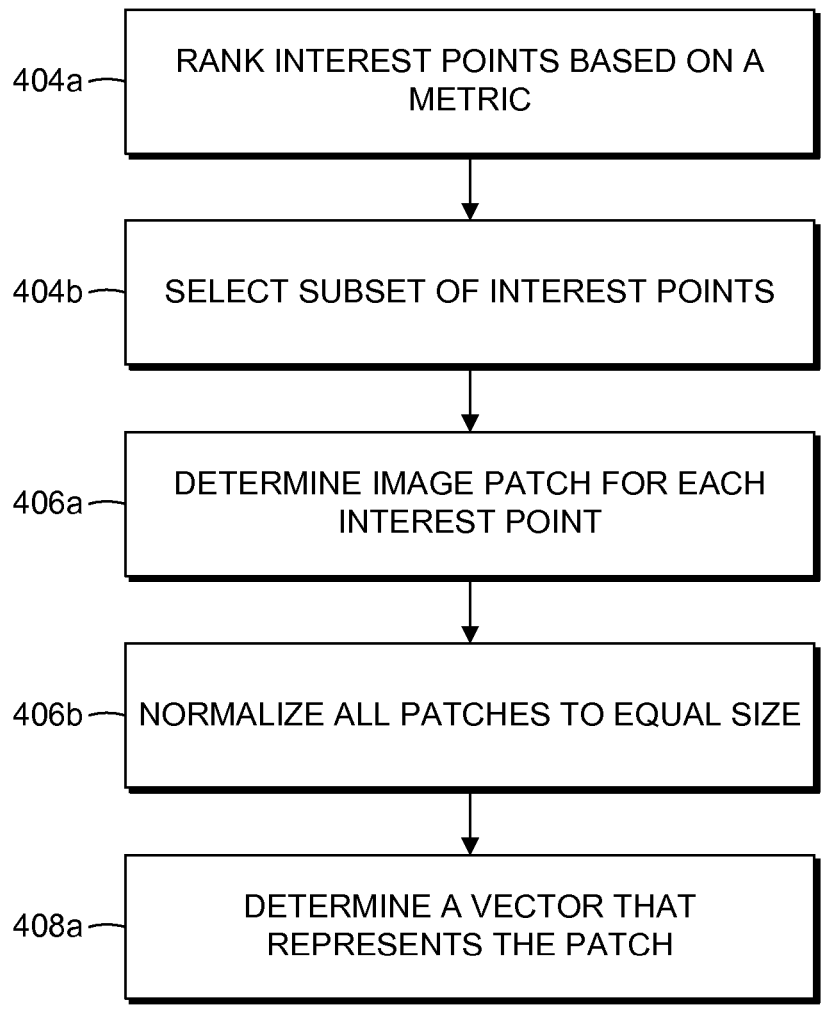
FIG. 5 is a flow diagram further depicting the method for generating a representation of the content of an image for content-based image searching depicted in FIG. 4 in accordance with an embodiment of the invention.

With reference now to FIG. 5, a flow diagram further depicting the method 400 for generating a representation of the content of an image for content-based image searching depicted in FIG. 4 is described in accordance with an embodiment of the invention. Following the identification of interest points in the image as described above, and indicated at 404, the interest points are ranked based on a metric, as indicated at 404a. The interest points may be ranked on any available metric such as, for example and not limitation, a signal strength or a signal to noise ratio of the image at or around the interest point. A subset of the interest points is selected based on the ranking, as indicated at 404b. The subset may include only a desired number of the most salient or highest ranked interest points, or may include all of the interest points. In another embodiment, the ranking and selection of a subset is not performed on the interest points, but rather is performed on the patches or descriptors that are determined in the subsequent steps described below.

At 406a an image patch is determined for each interest point in the subset as described previously. The image patches are normalized such that all of the image patches have the same size, as indicated at 406b. For example, the image patches may be increased or decreased in resolution such that all of the image patches have equal height and width pixel dimensions, such as 25 pixels×25 pixels. At 408a, a vector is determined that represents each patch. The vector is a multi-dimensional vector, such as a T2S2 vector having 36 dimensions, that represents the grayscale gradients of the pixels in the patch.

Figure 6:
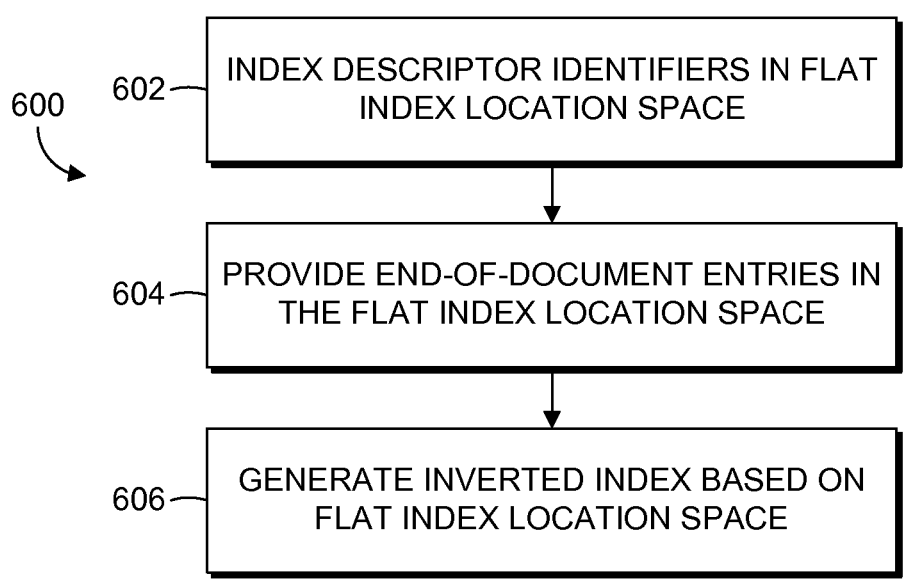
FIG. 6 is a flow diagram depicting a method for indexing descriptor identifiers in accordance with an embodiment of the invention.

Turning now to FIG. 6, a flow diagram depicting a method 600 for indexing descriptor identifiers in accordance with an embodiment of the invention is described. At 602, the descriptor identifiers for an image, such as the image 1200 are indexed in a flat index location space. The descriptor identifiers are grouped together and listed sequentially in the flat index location space and are followed by an end-of-document identifier, as indicated at 604. Each of the descriptor identifiers and the end-of document identifier are provided with a location identifier indicating their respective location in the flat index location space. In an embodiment, the descriptor identifiers are not actually provided with a location identifier, rather their locations are merely tracked or identifiable within the flat index location space. At 606, an inverted index is generated based on the descriptor identifiers and their respective location identifiers indexed in the flat index location space. The inverted index provides a listing of the descriptor identifiers along with indications of their respective locations within the flat index location space. The end-of-document identifiers are also included in the inverted index as described previously above.

Figure 7:
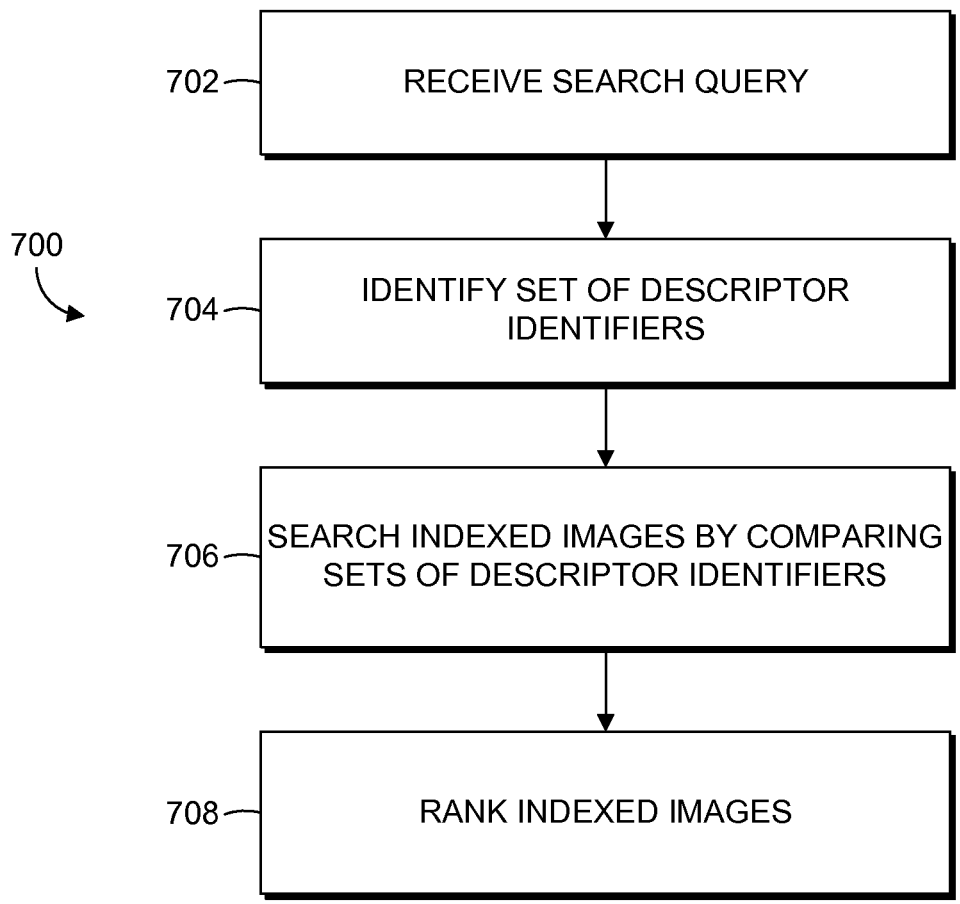
FIG. 7 is a flow diagram depicting a method for searching images in accordance with an embodiment of the invention.

With reference to FIG. 7, a flow diagram depicting a method 700 for providing content-based candidate images in accordance with an embodiment of the invention is described. At 702, a search query is received. In one embodiment, the search query includes an image as the search query. In an embodiment, the search query includes textual elements in addition to the image or instead of the image. In another embodiment, one or more data elements, such as metadata, that are descriptive of the image and/or the intent or context of the search query are received with the query. In a further embodiment, the search query is a text-based search query.

A set of descriptor identifiers is identified for the search query, as indicated at 704. As described previously, the descriptor identifiers are identified from the content of an image when the search query comprises an image. In an embodiment, the set includes one hundred (100) descriptor identifiers. In such an embodiment, using one hundred descriptor identifiers provides a compact representation of the content of the image while also provide sufficient content information to generate valuable results from the search. In an embodiment, the number of descriptor identifiers included in a set corresponds with the maximum number of search elements that are useable by a search engine to perform a search. In another embodiment, when a text-based search query is received, the descriptor identifiers are identified from a mapping of a textual element of the text-based search query to the descriptor identifiers. The mapping may be completed by providing a table, or other data structure, indicating one or more descriptor identifiers that are associated with a given textual element.

At 706, the set of descriptor identifiers is utilized to perform a search to identify candidate images where candidate images are indexed images that include at least a predetermined number of matching descriptor identifiers with the search query image. In an embodiment, performing the search compares the set of descriptor identifiers of the search query with a set of descriptor identifiers associated with each of the indexed images. In another embodiment, the set includes one hundred descriptor identifiers and the required number of matching descriptor identifiers is determined to be ten (10). Identifying indexed images with at least ten matching descriptor identifiers provides a sufficient, number of matching candidate images while also maintaining a desired level of precision.

The candidate images are ranked based on the total number of matching descriptor identifiers, as indicated at 708. In an embodiment, the candidate images are identified by multiple searches performed using multiple inverted indexes on an equal multiplicity of databases. The results of the multiple searches are then reported to a single computing device and are preliminarily ranked based on the total number of matching descriptor identifiers as described above. The results are then re-ranked using a term frequency-inverse document frequency (TF-IDF) ranking or based on one or more transformations, analysis, image characteristics, or the like.

Figure 8:
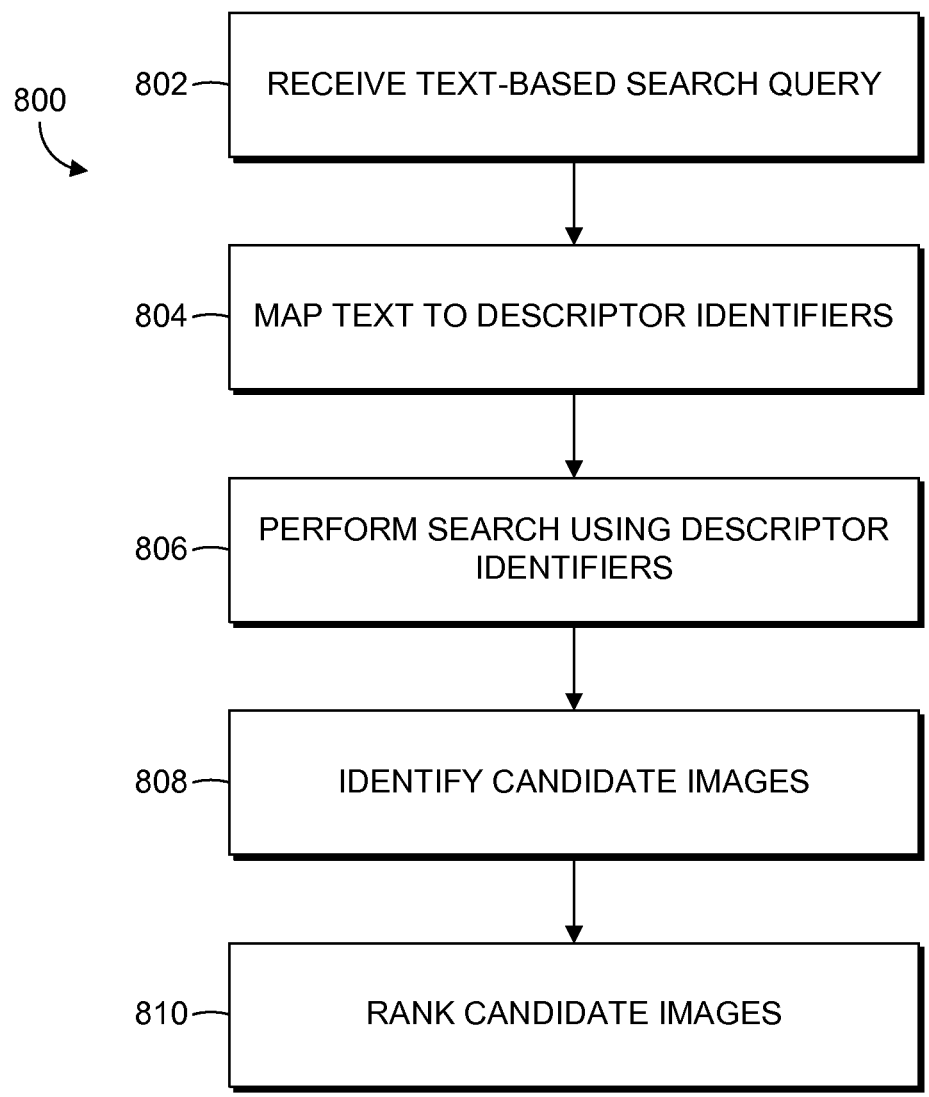
FIG. 8 is a flow diagram depicting a method for providing content-based candidate images and text-based search results in accordance with an embodiment of the invention.

With reference now to FIG. 8, a flow diagram depicting a method 800 for providing content-based candidate images in response to a text-based search query in accordance with an embodiment of the invention is described. At 802, a text-based search query including one or more textual search elements, such as a word or phrase, is received. At 804, one or more of the textual search elements is mapped to one or more descriptor identifiers associated with the textual search elements.

An association between one or more descriptor identifiers and textual search elements can be predefined and stored in a table or other data structure that is useable by a search engine to identify when such an association is present with a received text-based search query. For example, a set of descriptor identifiers might always, or nearly always occur in images of a soccer ball. Textual words relevant to soccer balls, such as for example "soccer," might be associated with that set of descriptor identifiers. Thus, when one of those words is received in a search query, the associated set of descriptor identifiers can be identified and a content-based search performed therewith, as indicated at 806. At 808, candidate images are identified via the search, thereby providing content-based search for images as a result of a text-based search query. At 810, the candidate images are ranked. The ranking may be based on any desired characteristic or algorithm, including ranking based on a total number of matching descriptor identifiers between the candidate image and the search query descriptor identifiers.

In another embodiment, a textual search result is provided in response to a search query where the search query is an image. Visually similar images to the query image are identified by a content-based search as described above. Textual elements, metadata, and other information associated with one or more of the visually similar images is aggregated. At least a portion of the aggregated data is then provided as a textual search result in response to the search query. For example, a user might capture an image of a product, such as a television, on their wireless phone and execute a search query based on the image. A user interface is then presented to the user displaying aggregated information based on the image, such as the name and model number of the product, prices of the television found at retailers, specifications, and the like. The aggregated information might be presented in an encyclopedic or similar informational format or may utilize a standard search results page format with links to various webpages, among other formats.

Figure 9:
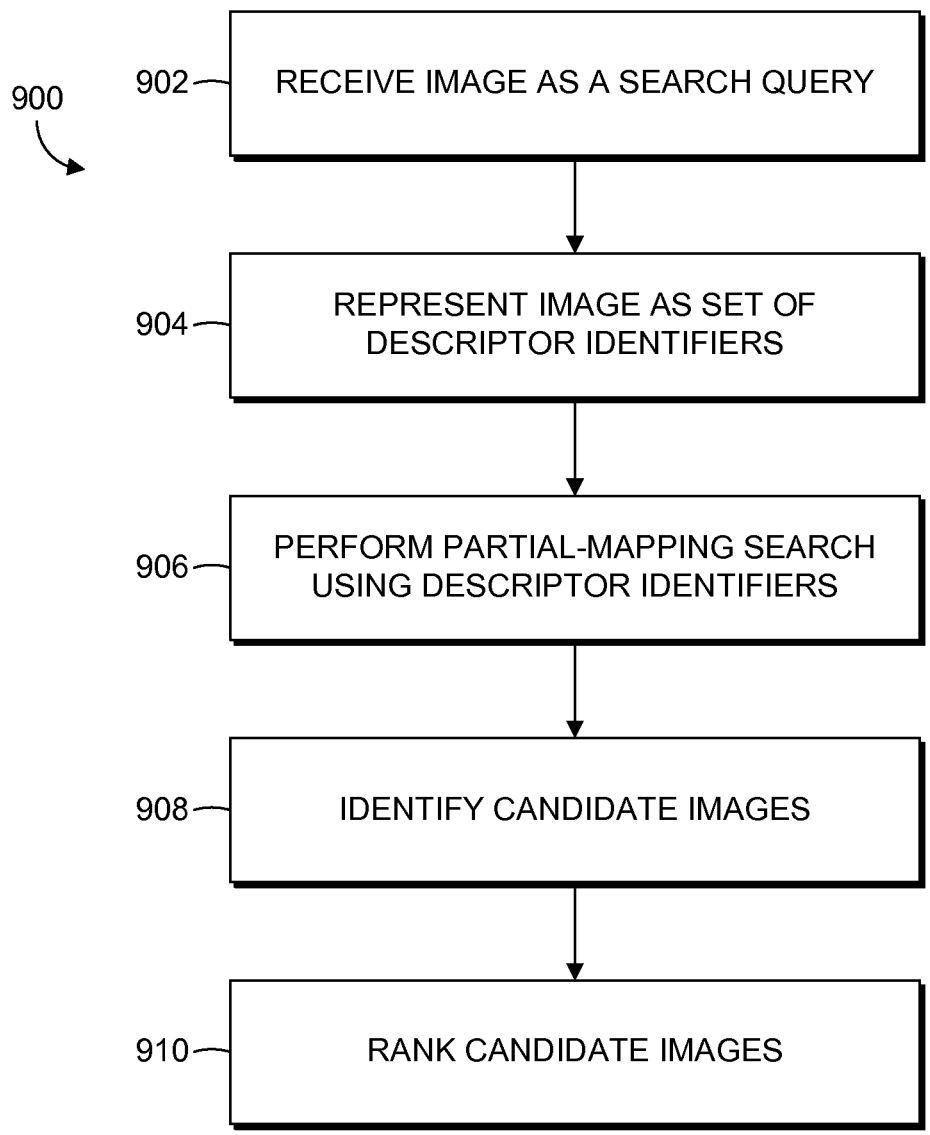
FIG. 9 is a flow diagram depicting a method for providing content-based candidate images in response to a text-based search query in accordance with an embodiment of the invention.

With reference to FIG. 9, a flow diagram depicting a method 900 for providing candidate images for an image received as a search query in accordance with an embodiment of the invention is described. At 902, an image is received as a search query. At 904, the image is represented as a set of descriptor identifiers as described previously. A partial-matching content-based search is performed using each of the descriptor identifiers as a search element and using an inverted search index, as indicated at 906. At 908, candidate images are identified from the search based on the number of matching descriptor identifiers between the search query image and the candidate images. The identified candidate images are ranked based at least on a total number of matching descriptor identifiers with the search query image, as indicated at 910.

Figure 10:
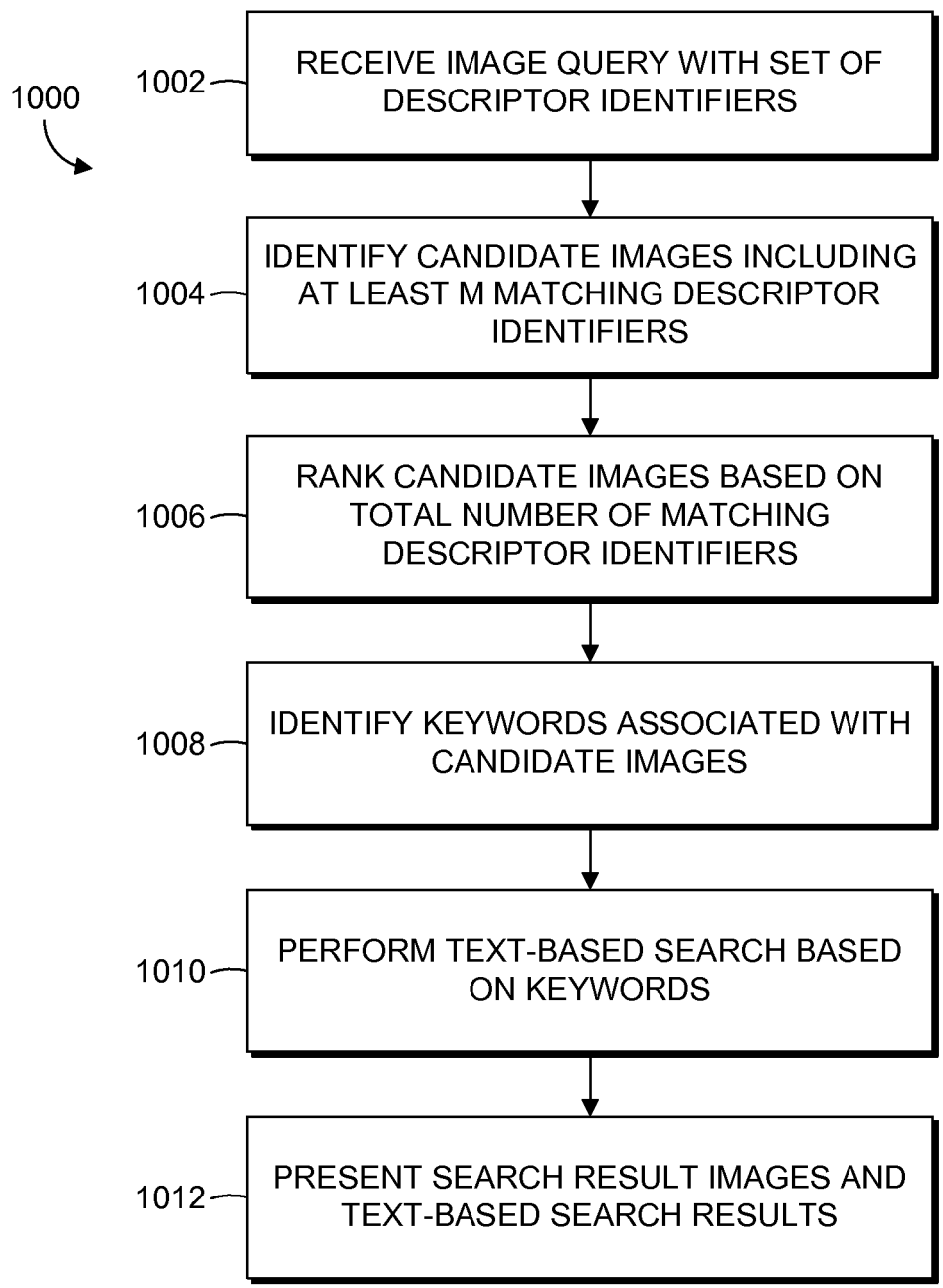
FIG. 10 is a flow diagram depicting a method for providing content-based candidate images for an image received as a search query in accordance with an embodiment of the invention.

With reference to FIG. 10, a flow diagram depicting a method 1000 for providing content-based candidate images and text-based search results in accordance with an embodiment of the invention is described. At 1002, an image query is received with a set of descriptor identifiers representing the content of an image. At 1004, candidate images that include at least a predetermined number of matching descriptor identifiers with the descriptor identifiers of the search query are identified. The candidate images are ranked based on a total number of matching descriptor identifiers, as indicated at 1006.

At 1008, keywords associated with the candidate images are identified. The keywords are identified from aggregated data elements for one or more of the candidate images. The data elements are collected and aggregated from webpages in which the candidate images are published, from file names of the candidate images, and from metadata associated with the candidate images. At 1010, a text-based search is performed based on one or more of the identified keywords. The candidate images are presented as search result images along with one or more text-based search results, as indicated at 1012. The search result images and text-based search results are presented in any manner known in the art, such as for example via a search results webpage. The text-based search results include any form of non-content-based search results known in the art, including, for example and not limitation, links to webpages, images, and the like.

Figure 11:
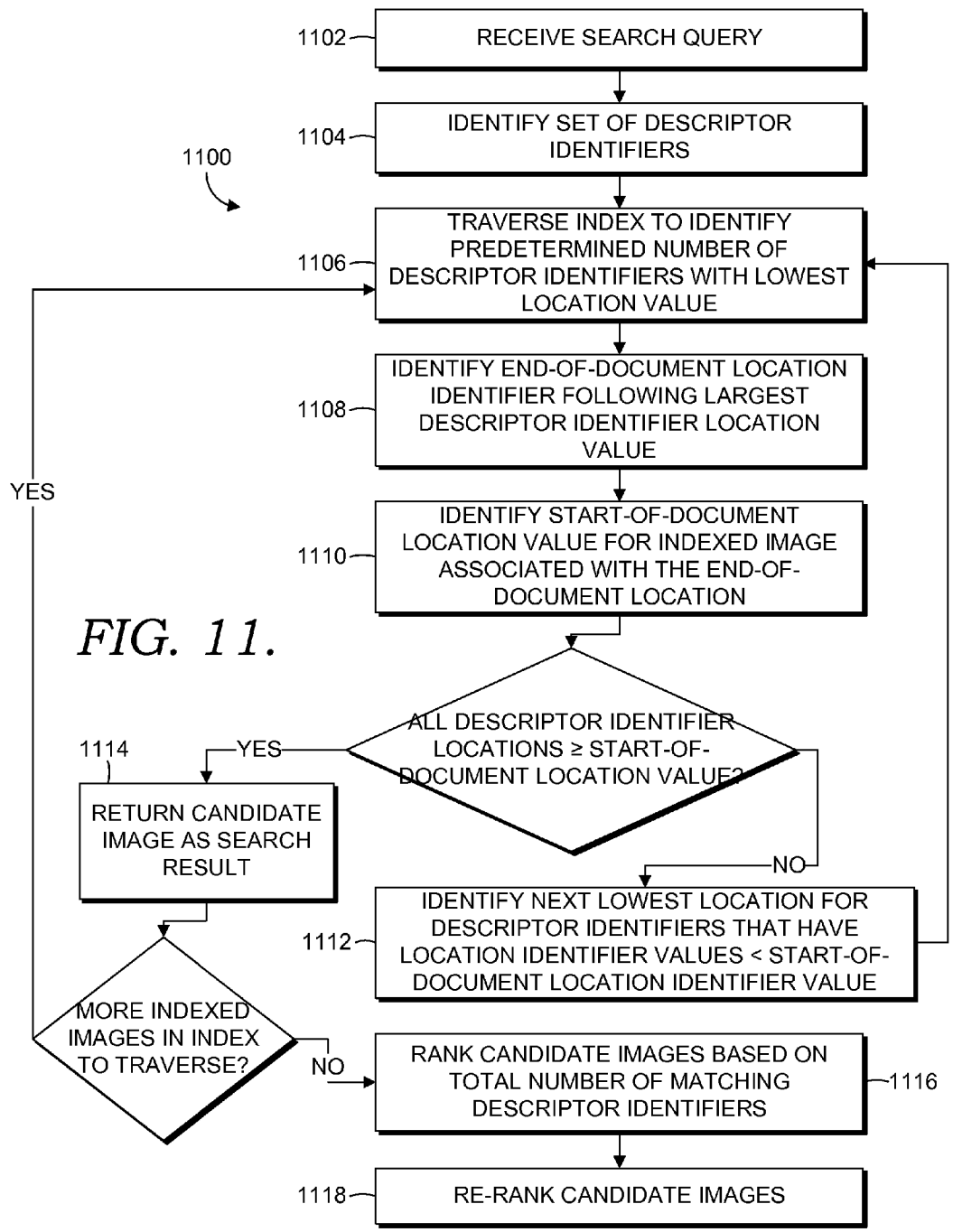
FIG. 11 is a flow diagram depicting a method for performing a content-based image query in accordance with an embodiment of the invention.

Referring now to FIG. 11, a flow diagram depicting a method 1100 for performing a content-based image query in accordance with an embodiment of the invention is described. At 1102, a search query is received. A set of descriptor identifiers is identified from the search query as indicated at 1104 and as described previously. At 1106, a portion of an index is traversed to identify a predetermined number of descriptor identifiers having the lowest location identifier values. In an embodiment, the index is an inverted index. At 1108, an end-of-document location identifier that follows the largest location identifier value of the predetermined number of descriptor identifiers having the lowest location identifier values is identified. At 1110, a start-of-document location value is identified for an indexed image that is associated with the end-of-document location identifier identified in step 1108. In an embodiment, the start-of-document location identifier value is equal to one location greater than the location identifier value of the end-of-document location identifier that immediately precedes the end-of-document location identifier identified in step 1108.

At 1112, when all of the location identifier values of the descriptor identifiers included in the predetermined number of descriptor identifiers having the lowest location identifier values are not greater than or equal to the start-of-document location identifier value, the location identifier value of one or more of the descriptor identifiers having a location identifier value less than the start-of-document location identifier value is incremented to the next lowest value for the respective descriptor identifier that is larger than the start-of-document location identifier value. The process then iterates back to 1106.

At 1114, when all of the identified location identifier values are greater than or equal to the start-of-document location identifier value, the associated image is returned as a candidate image. The process iterates back to 1106 when there are more indexed images in the index that may include the predetermined number of matching descriptor identifiers. At 1116, the candidate images are ranked base on the total number of matching descriptor identifiers between the candidate image and the search query. The number of candidate images may then be reduced based on the ranking and the remaining candidate images are re-ranked based on one or more geometric verifications, transformations, or other comparisons, as indicated at 1118. One or more of the re-ranked candidate images may then be presented as search result images to a user via a webpage or other user interface known in the art.

In another embodiment, a partial-matching content-based image search based on a query image, Q, employs a search algorithm following the below pseudocode.

```
While Current(EDOC) < MAX_LOC {
    Init: num_match = 0;
        EndDoc = Current(EDOC);
        StartDoc = Previous(EDOC) + 1;
        H.Clear( ); // clear the heap H, .
    For each descriptor identifier, w, in Q
        Seek(w, StartDoc);
        If loc(w) < EndDoc // current document contains descriptor
        identifier w
            num_match ← num_match + 1;
            NextDoc = EndDoc + 1;
        else
            NextDoc = loc(w);
        If H.Size < M
            H.Add(NextDoc);
        else if H.Top > NextDoc
            H.Pop( ); // remove the top element from heap.
            H.Add(NextDoc);
    If num_match >= M
        return current document;
    else
        Seek(EDOC, H.Top);
}
```

Embodiments of the invention can be utilized and adapted to increase the relevance and value of search result images and information returned in response to a search query performed as described above. Several exemplary embodiments of such are described below.

In one embodiment, a content-based search is performed for a query image on the index. The query image is a sample image from the index or is a new image received from a user. Metadata, tags, and other additional data associated with one or more of the search result images returned from the search are aggregated. From the aggregated data meaningful and relevant tags or metadata are constructed or identified and associated with the query image. As such, future content-based searches based on the query image and/or one of the search result images are more informed and can provide more relevant search results through use of the associated metadata and tags. Further, additional text-based searches can be performed for the query image to provide additional search results.

Figure 17:
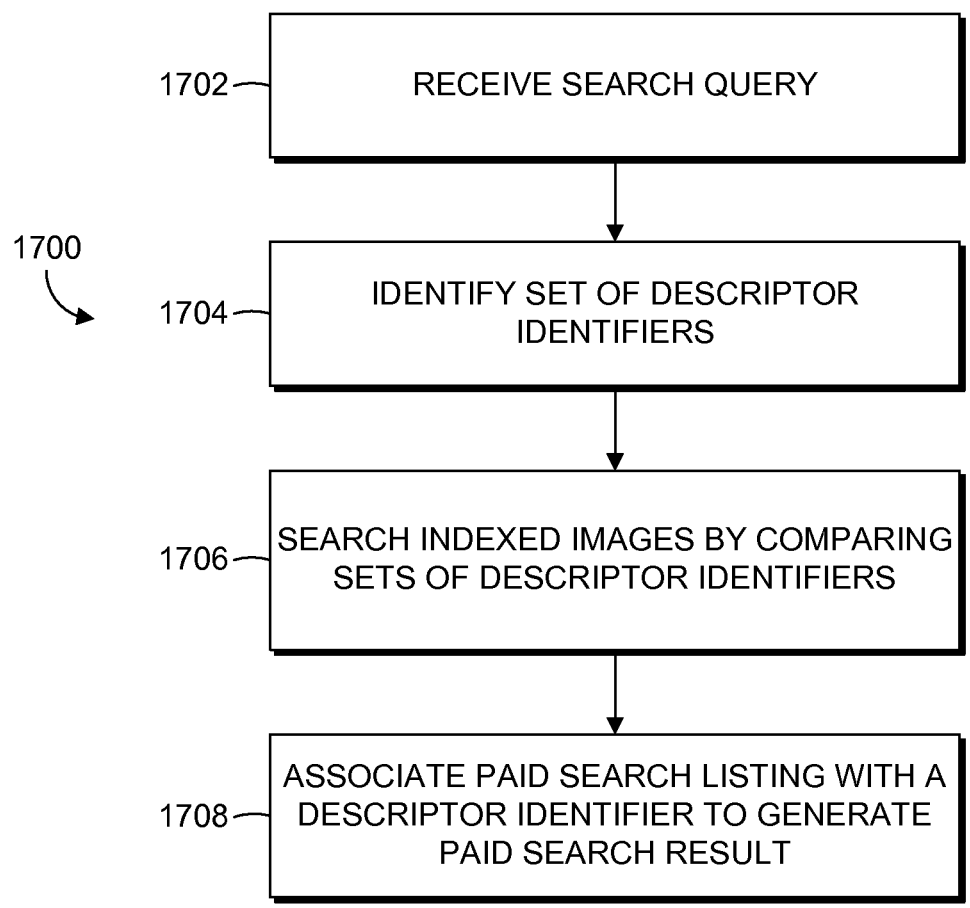
FIG. 17 is a flow diagram depicting a method for associating paid search results with algorithmic image-based search results in accordance with an embodiment of the invention.

In another embodiment of the invention, content-based search may be utilized in the presentation of paid listings or advertisements to a user. FIG. 17 depicts one such method 1700 for associating paid search results with algorithmic image-based search results in accordance with an embodiment of the invention. At 1702, a search query is received. The search query may include or comprise an image, an image with additional textual data, metadata, tags, and the like, or may be a text-based search query. A set of descriptor identifiers is identified based on the search query, as indicated at 1704. The indexed images are searched by comparing the set of descriptor identifiers with sets of descriptor identifiers associated with the indexed images as described previously above, as indicated at 1706.

At 1708, paid search listings are associated with one or more descriptor identifiers to generate at least one paid search result. For example, by aggregating metadata, tags, keywords, domains, and other information for an image or a group of images as described in the embodiments above, relevant paid search listings may be identified based on the aggregated data and presented to a user as paid search results along with the query search results. In another embodiment, one or more paid search listings are associated with a group of descriptor identifiers. As such, the one or more paid listings are presented to a user in response to receiving a search query associated with the group of descriptor identifiers. Alternatively, an advertisement might be associated with a keyword that is further associated with one or more descriptor identifiers. Thus, when a search query is received indicating the one or more descriptor identifiers, the keyword is determined based on the descriptor identifiers, and the advertisement is identified based on the keyword.

Additionally, content-based search might be used in the sale or auctioning of images and image content for paid listing or advertising purposes. Advertising rights can be sold, auctioned, or assigned for specific images or general image subject matter that is identifiable based on a set of descriptor identifiers for those images. Advertising rights might be sold for a specific image or for a set of descriptor identifiers that are associated with a specific image or group of images.

Figure 18:
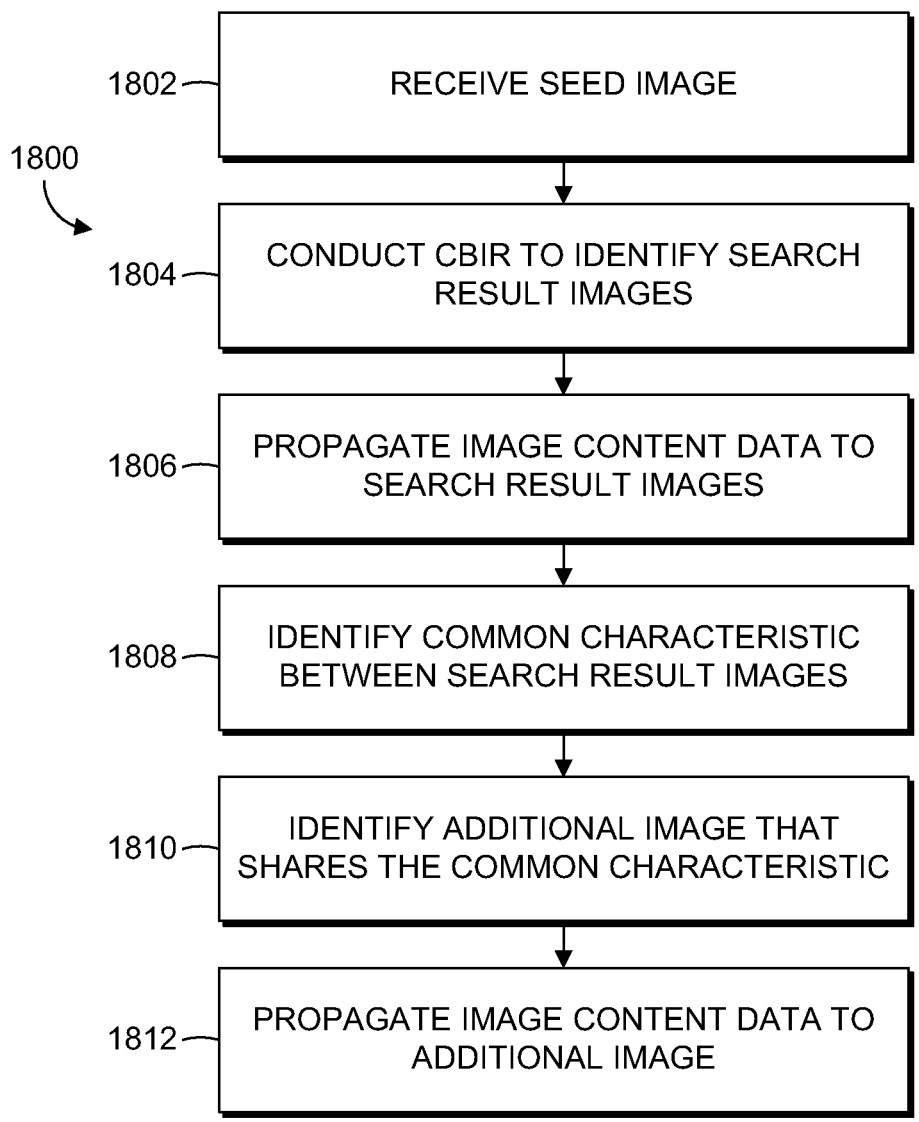
FIG. 18 is a flow diagram depicting a method for propagating image metadata in accordance with an embodiment of the invention.

Turning now to FIG. 18, a method 1800 for propagating image metadata is described in accordance with an embodiment of the invention. In an embodiment, the method 1800 is performed by one or more of the image processing server 208, the search engine server 206, and the query input device 204. In another embodiment, the method 1800 employs one or more components of the content-based image search system 300 during performance of the method. As described above, image metadata includes any information that is associated with an image. The information is descriptive of one or more of the image, it's characteristics, content, source, format, file type, and the like. In an embodiment, the metadata includes the domain from which the image was collected or in which the image is published to the network.

A domain or network domain, as referred to herein, is descriptive of one or more computing devices communicatively coupled to a network that publish or make content available on the network. A domain is also used herein to refer to the address that represents the one or more computing devices that publish content on the network and that is used to connect to those computing devices over the network. The domain address may include any number of domain name levels including, a top-level domain, a secondary level domain, a tertiary domain, as well as suffixes such as a country code. The domain name may be provided and employed in an alphabetical address form or an associated internet protocol address. For example, the domain might be "www.company.com" or "123.121.92.221."

The image metadata may also include one or more content categories associated with the image. A content category comprises any classification into which images can be grouped or subdivided based on the content portrayed in the image. For example, a content category might include adult content, sports content, news content, and the like. Content categories might also include photographic images, cartoon images, paintings, cars, trains, and flowers, among others. The information is associated with the image as, for example, tags, labels, and metadata, among others.

With continued reference to FIG. 18, a seed image is received, as indicated at 1802. In an embodiment, a plurality of seed images is received. The seed image comprises an image with known image metadata that includes at least a content category with which the seed image is associated. The seed image is an image stored in an image database, such as the image store 212, or may be any desired image that can be associated with a content category.

At 1804, a content-based image retrieval (CBIR) is conducted using the seed image as the search query image to identify one or more search result images from the image store 212. As described above, the CBIR determines a descriptor identifier associated with each of a plurality of interest points in the seed image. The seed image can then be represented as a set of descriptor identifiers and a search executed against an index of descriptor identifiers for images stored in the image store 212. Search result images in the image store 212 having at least a minimum number of matching descriptor identifiers are identified. In an embodiment, the minimum required number of matching descriptor identifiers is set at a great enough level to minimize the number of falsely identified search result images, e.g. minimize the number of identified search result images that do not match the seed image. The CBIR returns search result images that are duplicates of the seed image, are similar to the seed image, or that are modifications or transformations of the seed image.

The image metadata of the seed image is propagated to the search result images, as indicated at 1806. As such, the search result images are associated with the content category of the seed image. Additionally, image metadata associated with the search result images is aggregated to identify any common characteristics that exist between two or more of the search result images, as indicated at 1808. Any commonality between two or more of the search result images that is useable to aid in identifying more images that should be associated with the content category of the seed image may be identified and used in subsequent steps. In an embodiment, domains in which two or more of the search result images are published are identified.

At 1810, the identified common characteristic is employed to perform one or more searches for additional images that should be associated with the content category. The searches can include additional CBIR searches, text-based searches, or a combination thereof. For example, where two or more search result images are published in the same domain, that domain is searched to identify additional images. In another embodiment, the indexed images in the image store 212 are searched to identify additional images that are published in or associated with the domain.

The image metadata of the seed image is then propagated to the identified additional images, as indicated at 1812. As such, images that are not duplicates of the seed image, similar to the seed image, or modifications of the seed image are provided with image metadata such as a content category. Such provides additional valuable information about the images that is useable to inform subsequent text-based searches, CBIR searches, or hybrids thereof. The information enables searches of the image store 212 to provide more relevant search results, to filter the search results, or to promote or demote the search results images based on the propagated image metadata. For example, a user conducting an image search may elect to restrict the return of images including adult content as search result images, or the user may elect to only have images associated with the category "flowers" returned as search result images. In another example, it is determined that a user's search query is directed to a product or a particular category. As such, the image metadata can be used to promote images that are related to the product or the category or to demote images that are not.

Figure 19:
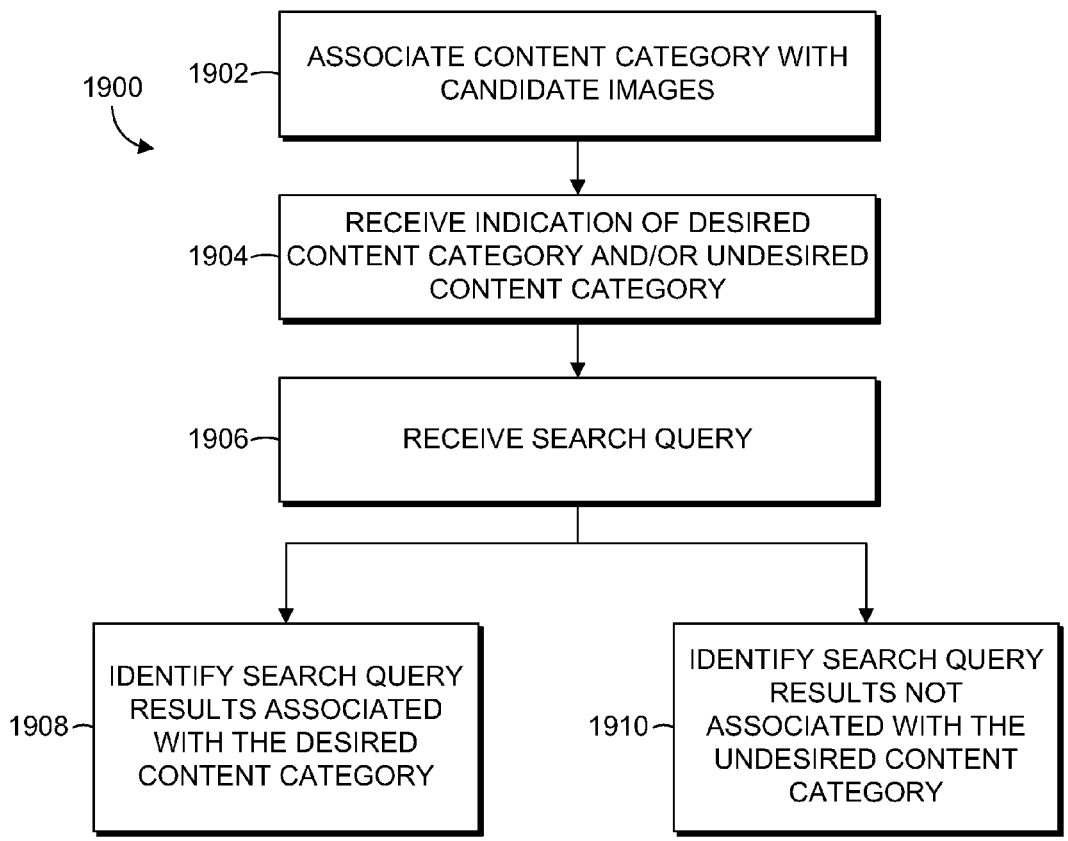
FIG. 19 is a flow diagram further depicting a method for filtering search results based on a content category associated therewith in accordance with an embodiment of the invention.

Referring now to FIG. 19, a method 1900 for filtering search results based on a content category associated therewith is described in accordance with an embodiment of the invention. At 1902, a content category is associated with one or more candidate images that are stored in the image store 212. The content category is associated with the candidate images by propagating the content category of one or more seed images to the candidate images. To propagate the content category one or more CBIR searches are performed to identify search result images in the image store 212 that are duplicates, similar to, or modifications of the seed images. The content category of the seed images is then associated with each of the identified search result images.

Additionally, a domain to which one or more of the search result images belongs or at which the search result images are published is identified. A search of the domain is conducted to identify additional images. Alternatively or in addition, a search is conducted in the image store 212 to identify additional images in the image store 212 that are associated with the domain. The content category is then associated with each of the additional images.

At 1904, an indication of one or more desired content categories and/or undesired content categories is received. The indication is provided by a user as a search option or as a setting or user preference in a search engine configuration. Alternatively, or in addition, the indication is provided by an administrator of the search engine as a default configuration, among others. For example, a user may set a search engine preference to restrict the provision of adult content in search query results, or a search engine provider might restrict the provision of adult content in search query results as a default for the search engine. The indication of desired and undesired content categories is provided by any method known in the art, such as for example and not limitation, a user selecting a radio button in a preferences menu, among others.

A search query is received, as indicated at 1906. The search query is provided in any manner known in the art such as a user entering search query terms in a search field of a search engine webpage, among others. The search query may be an image search query or a text-based search query. Further, the search query terms may be text or may be an image as described above. Search query results that are associated with a content category that was indicated as desired are identified based on the propagated content category, as indicated at 1908. Alternatively, or in addition, search query results that are not associated with an undesired content category are identified based on the propagated content category, as indicated at 1910. The search query results include images stored in the image store 212 and may include textual search query results. In an embodiment, the intent of the search query is also determined and the propagated content category data is employed to promote or demote search results. For example, where the search query is identified as a search for a product, search result images having content category data related to products or to the specific searched for product can be promoted.

Figure 20:
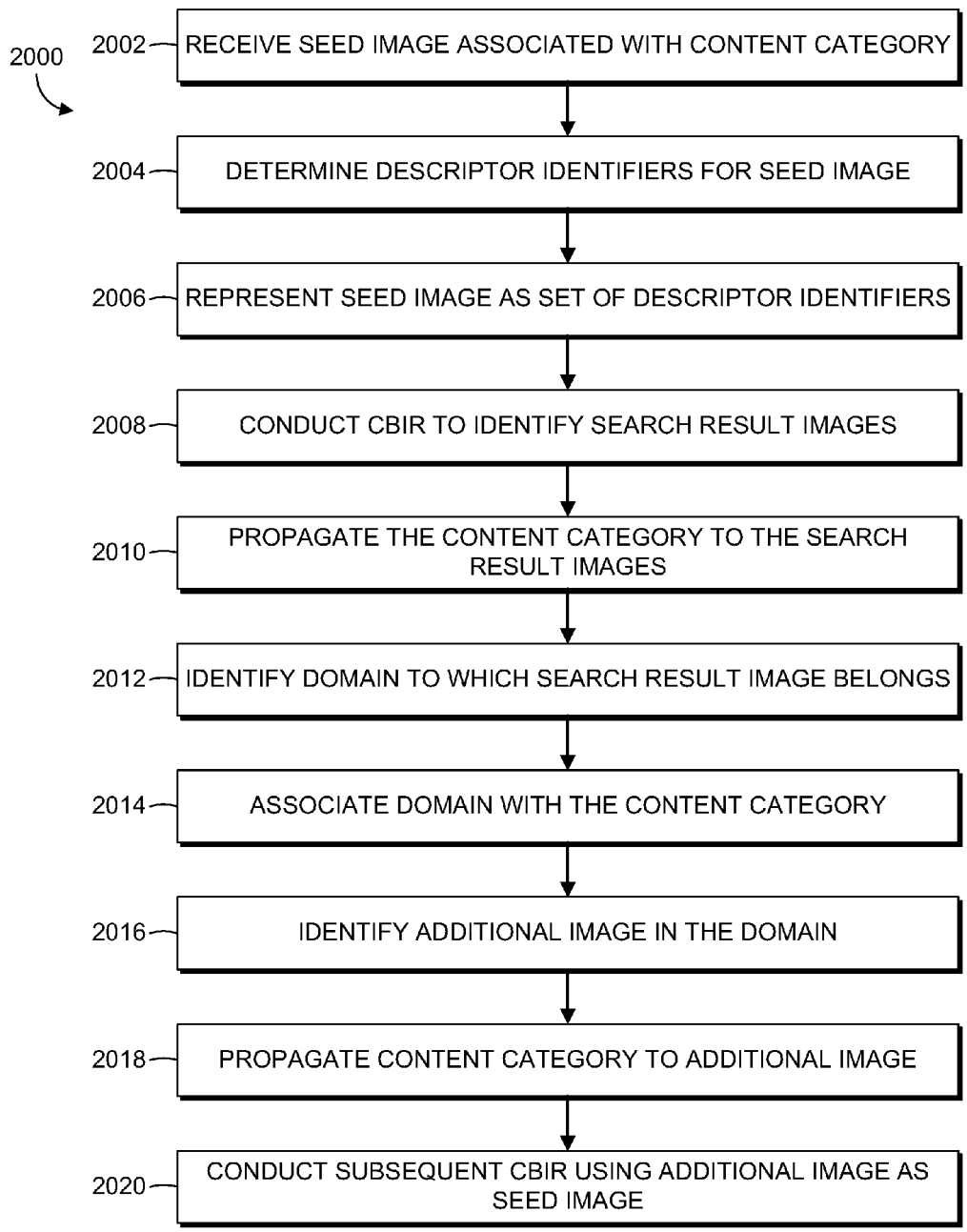
FIG. 20 is a flow diagram depicting a method for categorizing network domains in accordance with an embodiment of the invention.

With reference to FIG. 20, a method 2000 for categorizing network domains is described in accordance with an embodiment of the invention. At 2002, a seed image associated with a content category is received. In an embodiment, a plurality of seed images is received. Descriptor identifiers are determined for the seed image as described previously above and as indicated at 2004. The seed image is then represented as a set of descriptor identifiers, as indicated at 2006. The set of descriptor identifiers is employed to conduct a CBIR to identify search result images from the image store 212 that are duplicates, similar to, or modifications of the seed image, as indicated at 2008. The content category of the seed images is then propagated to the search result images, as indicated at 2010. In an embodiment, the similarity between the seed image and the search result image provides a strong basis for determining that the seed image and the search result images include similar content and should be associated with the same content category. In another embodiment, the seed image and the search result images belong to more than one content category. In such an instance, one or more of the seed image's content categories are propagated to the search result images.

At 2012, a domain to which one or more of the search result images belongs or at which the search result is published is identified. The domain is then associated with the content category such that any images stored in the image store 212 that are associated with the domain can be associated with the content category and any new images that are collected or received from the domain can also be associated with the content category, as indicated at 2014. In an embodiment, techniques such as using a text-based classifier or a low-level image processing are used to aid in determining whether the domain should be associated with the content category. For example, a text-based classifier can be used to analyze the text content of the domain such as the domain name, a webpage title, text on the webpage, uniform resource locator (URL) links in the webpage, and hypertext markup language (HTML) code for the page, among others. Additionally, low-level image processing might be used to analyze other images on the webpages of the domain to determine if their content is consistent with the seed image and the content category.

In an embodiment, such techniques are employed to assist in calculating a confidence level that indicates the likelihood that the domain should be associated with the content category. If the calculated confidence level is low the domain may not be associated with the content category. Additionally, a human judge might be employed to provide a determination to include or exclude the domain from association with the content category.

In another embodiment, when it is determined that the domain should be associated with the content category, the domain can be analyzed to identify one or more content specific features or elements that can be used to identify other domains that should be associated with the content category. These content specific features or elements include, for example, but not limitation, URL addresses, key words, key phrases, or names that are commonly found in association with content belong to the content category. For example, webpages often provide URL address links to similar websites and multiple disparate webpages will often include names of specific people, equipment, or other items that are commonly used or associated with content belonging to a specific content category. As such, content specific features may be extracted from domains identified as belonging to a content category and stored for later use in determining whether subsequently identified domains should be associated with the content category.

At 2016, an additional image in the domain is identified. The additional image is identified from the image store 212 or is retrieved from the domain. The content category is then propagated or associated with the additional image, as indicated at 2018.

At 2020, the method 2000 iterates to employ the additional image as a seed image to conduct a subsequent CBIR. The subsequent CBIR identifies one or more subsequent search result images that can also be associated with the content category. Additional domains might be identified from tags, labels, or metadata associated with the subsequent search results and subsequent additional images can be identified and associated with the content category. The method 2000 is iterated any desired number of times or until no subsequent search results or additional images can be identified. As such, a complete or nearly complete categorization of the images stored in the image store 212 is provided.

In an embodiment, the categorization does not require a human judge to identify search result images or additional images as belonging to a content category. The categorization process is fully automated after the initial seed images are received. In another embodiment, a human judge is utilized to confirm categorization of images for which a confidence value is below a threshold. A confidence value may be calculated for one or more of the search result images and additional images. The confidence value provides an indication of the certainty that an image is a match to the image on which the CBIR is based, e.g. the seed image. The confidence value might also provide an indication of the certainty that an image belongs to a content category.

In an exemplary embodiment, the above method 2000 is employed by an image search engine administrator to identify and label indexed and/or stored images that comprise adult or pornographic content. The method 2000 is employed as a background process that is not noticed (apart from the benefits realized by the propagation of the content categories) by external users of the search engine system. Labeling of the images is desirable to allow restricting or limiting the return of adult content images as search query results. The administrator begins by identifying a group of seed images that comprise adult content and thus, are associated with an adult content category. A CBIR is performed for each of the seed images to identify a plurality of search result images from the stored images that are duplicate, similar, or modified versions of the seed images. The adult content category label is then propagated to the search result images. The threshold number of matching descriptor identifiers between the seed images and the search result images is set at a level that minimizes the number of false-matches while also adequately identifying images that should be considered matches. A confidence level might also be calculated to aid in discriminating between good matches and false-matches. Additional techniques such as image analysis to identify a skin score or an analysis of other metadata or text associated with the image can also be used to minimize the number of false-matches.

Tags, labels, and other metadata associated with each of the search result images is aggregated to identify domains that might also contain adult content. The number of search result images that belong to a given domain can be used as a confidence level or in a calculation thereof. Domains with greater numbers of search result images therein are more likely to be associated with the adult content category.

Domains that are determined to include adult content are then associated with the adult content category. The metadata associated with the stored images is analyzed to identify additional stored images that belong to the identified adult content domains. The domains may also be searched and analyzed to identify additional images that include adult content. These additional stored images and images from the domain are associated with the adult content category.

Additionally, the domain can be searched and analyzed to identify content specific data elements that can be used to identify or confirm other subsequently identified domains as adult content. For example, the names of adult content movie stars might be extracted from the domains for use in identifying subsequently identified domains as adult content.

Next, CBIR is conducted using the additional images as seed or query images to identify more search result images from the stored images. The process continues for a desired number of iterations or until the adult content images in the stored images are fully labeled and associated with the adult content category. In another embodiment, the search results images that are identified from conducting the CBIR using the seed images are also used as query images for subsequent CBIR searches.

As such, when the stored images are later searched by a user, the search query results provided to the user may be filtered based on the adult content category. The user can be given an option to have such search query results included or excluded from the search query results provided thereto.

Many different arrangements of the various components depicted, as well as components not shown, are possible without departing from the scope of the claims below. Embodiments of the technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method for propagating image metadata:
   receiving one or more seed images associated with a content category;
   conducting a content-based image retrieval via a computing device having a processor and a memory to identify one or more search result images stored in one or more databases comprising computer-readable media and communicatively coupled to the computing device;
   propagating image metadata associated with the one or more seed images to the one or more search result images;
   identifying a common characteristic between one or more of the search result images;
   identifying an additional image that shares the common characteristic, wherein the additional image is not one of the search result images; and
   propagating the image metadata associated with the one or more seed images to the additional image.

2. The computer-implemented method of claim 1, further comprising:
   employing the additional image as a seed image in an iteration of the steps.

3. The computer-implemented method of claim 1, wherein identifying a common characteristic between one or more of the search result images further comprises:
   aggregating metadata associated with the one or more search result images, wherein the common characteristic is identified from the metadata.

4. The computer-implemented method of claim 1, wherein the common characteristic is a network domain.

5. The computer-implemented method of claim 4, further comprising:
   associating the domain with the content category.

6. The computer-implemented method of claim 5, further comprising:

identifying a stored image in the one or more databases that is associated with the domain; and
associating the content category with the stored image.

7. The computer-implemented method of claim 5, further comprising:
   analyzing content in the domain to determine that the domain is related to the content category.

8. The computer-implemented method of claim 7, further comprising:
   identifying one or more content specific data elements that can be used to identify other domains as belonging to the content category.

9. The computer-implemented method of claim 1, wherein a confidence level is calculated for each search result image that indicates a likelihood that the search result image belongs in the content category, and wherein a human judge determines that a search result image belongs in the content category or does not belong in the content category when the confidence level is below a predetermined threshold.

10. The computer-implemented of claim 1, wherein conducting a content-based image retrieval further comprises:
    for each of the one or more seed images, determining a descriptor identifier associated with each of a plurality of interest points in the seed image, wherein an interest point comprises one of a point, a region, or an area in the image that is identified by an operator algorithm;
    representing each of the seed images as a respective first set of descriptor identifiers;
    searching a plurality of indexed images by comparing the first set of descriptor identifiers for each seed image with one or more second sets of descriptor identifiers associated with the indexed images to identify the one or more search result images.

11. One or more computer storage media devices having computer-executable instructions embodied thereon that, when executed, perform a method for filtering search results based on a content category associated therewith, the method comprising:
    associating a content category with one or more candidate images by propagating content category data associated with one or more seed images to the one or more candidate images, wherein the content category data is propagated by performing a content-based image retrieval based on the one or more seed images to identify one or more retrieved images, propagating content category data for the one or more seed images to the one or more retrieved images, identifying a domain to which one or more of the retrieved images belongs, identifying an additional image in the domain, and propagating the content category data associated with the one or more seed images to the additional image, and wherein the one or more candidate images are indexed and stored in one or more databases and include the seed images, retrieved images, and additional image;
    receiving an indication of one or more of a desired content category and an undesired content category;
    receiving a search query;
    identifying via a computing device having a processor one or more search query results that are one or more of associated with the desired content category and not associated with the undesired content category.

12. The one or more computer storage media devices of claim 11, wherein, propagating category metadata is an iterative process and the additional image is used as the seed image in an iteration of the process.

13. The one or more computer storage media devices of claim 11, wherein propagating category metadata further comprises:
associating the domain with the content category.

14. The one or more computer storage media devices of claim 13, further comprising:
identifying a stored image in the one or more databases that is associated with the domain; and
associating the content category with the stored image.

15. The one or more computer storage media devices of claim 13, further comprising:
analyzing content in the domain to determine that the domain is related to the content category; and
calculating a confidence level that indicates a likelihood that the domain is related to the content category.

16. The one or more computer storage media devices of claim 11, wherein conducting a content-based image retrieval further comprises:
for each of the one or more seed images, determining a descriptor identifier associated with each of a plurality of interest points in the seed image, wherein an interest point comprises one of a point, a region, or an area in the image that is identified by an operator algorithm;
representing each of the seed images as a respective first set of descriptor identifiers;
searching a plurality of indexed images by comparing the first set of descriptor identifiers for each seed image with one or more second sets of descriptor identifiers associated with the indexed images to identify the one or more search result images.

17. A method for categorizing network domains, the method comprising:
receiving a seed image associated with a content category;
determining a descriptor identifier associated with each of a plurality of interest points in the seed image, wherein an interest point comprises one of a point, a region, or an area in the seed image that is identified by an operator algorithm;
representing the seed image as a first set of descriptor identifiers;
conducting a content-based image retrieval via a computing device having a processor and a memory to identify one or more search result images stored in one or more databases that include computer-readable media and that are communicatively coupled to the computing device by searching a plurality of indexed images in the one or more databases by comparing the first set of descriptor identifiers with one or more second sets of descriptor identifiers associated with the indexed images to identify the one or more search result images;
propagating the content category associated with the seed image to the one or more search result images;
identifying a domain to which one or more of the search result images belongs;
associating the domain with the content category;
identifying an additional image in the domain;
propagating the content category associated with the seed image to the additional image;
conducting one or more subsequent content-based image retrievals using the additional image or a subsequent additional image as a seed image to associate the content category with one or more subsequent domains and subsequent additional images.

18. The method of claim 17, further comprising:
identifying a stored image in the one or more databases that is associated with the domain; and
propagating the content category to the stored image.

19. The method of claim 17, wherein content categories associated with one or more images is employed to one or more of filter, promote, or demote search results for a user's search query.

20. The method of claim 17, wherein the content category represents adult content, and wherein search results for a search query executed on the plurality of indexed images in the one or more databases are filtered based on the content category to prevent search results associated with the adult content category from being presented to a user.

* * * * *